(12) United States Patent
Vanderah et al.

(10) Patent No.: US 10,552,283 B2
(45) Date of Patent: *Feb. 4, 2020

(54) METHODS AND APPARATUS TO COMMUNICATIVELY COUPLE FIELD DEVICES TO A REMOTE TERMINAL UNIT

(71) Applicant: Bristol, Inc., Houston, TX (US)

(72) Inventors: Richard Joseph Vanderah, Marshalltown, IA (US); Robert John Findley, Seymour, CT (US)

(73) Assignee: Bristol, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/447,549

(22) Filed: Jun. 20, 2019

(65) Prior Publication Data
US 2019/0303262 A1    Oct. 3, 2019

Related U.S. Application Data

(63) Continuation of application No. 15/168,827, filed on May 31, 2016, now Pat. No. 10,360,125.

(51) Int. Cl.
| | | |
|---|---|---|
| *G01R 31/319* | (2006.01) | |
| *H01L 23/538* | (2006.01) | |
| *G06F 11/30* | (2006.01) | |
| *G06F 13/40* | (2006.01) | |
| *G05B 19/042* | (2006.01) | |

(52) U.S. Cl.
CPC ........ *G06F 11/3031* (2013.01); *G05B 19/042* (2013.01); *G06F 11/3051* (2013.01); *G06F 13/4068* (2013.01)

(58) Field of Classification Search
None
See application file for complete search history.

(56) References Cited

U.S. PATENT DOCUMENTS

| | | |
|---|---|---|
| 4,695,946 A | 9/1987 | Andreasen et al. |
| 4,707,834 A | 11/1987 | Frisch et al. |
| 5,005,152 A | 4/1991 | Knutsen |

(Continued)

OTHER PUBLICATIONS

United States Patent and Trademark Office, "Non-Final Office action," issued in connection with U.S. Appl. No. 15/168,827, dated Mar. 12, 2018, 25 pages.

(Continued)

*Primary Examiner* — Hyun Nam
(74) *Attorney, Agent, or Firm* — Hanley, Flight & Zimmerman, LLC

(57) ABSTRACT

Methods and apparatus to communicatively coupled field devices to a remote terminal unit are disclosed. The example apparatus includes a base rack for a remote terminal unit in a process control system. The example apparatus further includes a first termination module to be inserted in a first termination slot of the base rack. Wires communicatively coupled to a field device are to be terminated on the first termination module. The example apparatus also includes a first control module separate from the first termination module to be inserted in a first control slot of the base rack. The first control module is to be communicatively coupled with the first termination module via a backplane of the base rack. The first control module is to control communications with the field device.

22 Claims, 17 Drawing Sheets

(56) References Cited

U.S. PATENT DOCUMENTS

| | | | |
|---|---|---|---|
| 5,038,317 A * | 8/1991 | Callan | G05B 19/054 700/24 |
| 5,497,379 A | 3/1996 | Whetsel | |
| 5,659,748 A | 8/1997 | Kennedy | |
| 6,438,625 B1 | 8/2002 | Olson | |
| 6,662,254 B1 | 12/2003 | Tal et al. | |
| 6,757,774 B1 | 6/2004 | Benson et al. | |
| 7,043,586 B2 | 5/2006 | Benson et al. | |
| 7,102,893 B1 | 9/2006 | MacArthur et al. | |
| 7,299,312 B2 | 11/2007 | McKeown | |
| 7,409,469 B2 | 8/2008 | Dixon et al. | |
| 7,606,245 B2 | 10/2009 | Ma et al. | |
| 7,835,265 B2 | 11/2010 | Wang et al. | |
| 8,681,505 B2 | 3/2014 | Reimund | |
| 8,938,566 B2 | 1/2015 | Dhandapani et al. | |
| 9,124,446 B2 | 9/2015 | Vanderah et al. | |
| 9,214,935 B2 | 12/2015 | O'Connell et al. | |
| 9,338,919 B2 | 5/2016 | Kretschmann et al. | |
| 9,423,822 B1 | 8/2016 | Singh et al. | |
| 9,507,744 B2 | 11/2016 | Dhandapani | |
| 9,591,784 B2 | 3/2017 | Butterbaugh et al. | |
| 9,750,153 B2 | 8/2017 | Huang | |
| 10,095,594 B2 | 10/2018 | Vanderah et al. | |
| 2007/0217169 A1 | 9/2007 | Yeap et al. | |
| 2011/0266933 A1 | 11/2011 | Hanna | |
| 2012/0026674 A1 * | 2/2012 | Aldridge | G06F 1/187 361/679.33 |
| 2017/0228339 A1 | 8/2017 | Shao et al. | |
| 2017/0344445 A1 | 11/2017 | Vanderah et al. | |
| 2017/0344451 A1 | 11/2017 | Vanderah et al. | |

OTHER PUBLICATIONS

United States Patent and Trademark Office, "Non-Final Office action," issued in connection with U.S. Appl. No. 15/168,461, dated Dec. 13, 2017, 22 pages.

United States Patent and Trademark Office, "Non-Final Office action," issued in connection with U.S. Appl. No. 15/168,827, dated Oct. 1, 2018, 23 pages.

United States Patent and Trademark Office, "Notice of Allowance and Fee(s) Due," issued in connection with U.S. Appl. No. 15/168,461, dated Jun. 7, 2018, 22 pages.

United States Patent and Trademark Office, "Notice of Allowance and Fee(s) Due," issued in connection with U.S. Appl. No. 15/168,827, dated Mar. 15, 2019, 16 pages.

* cited by examiner

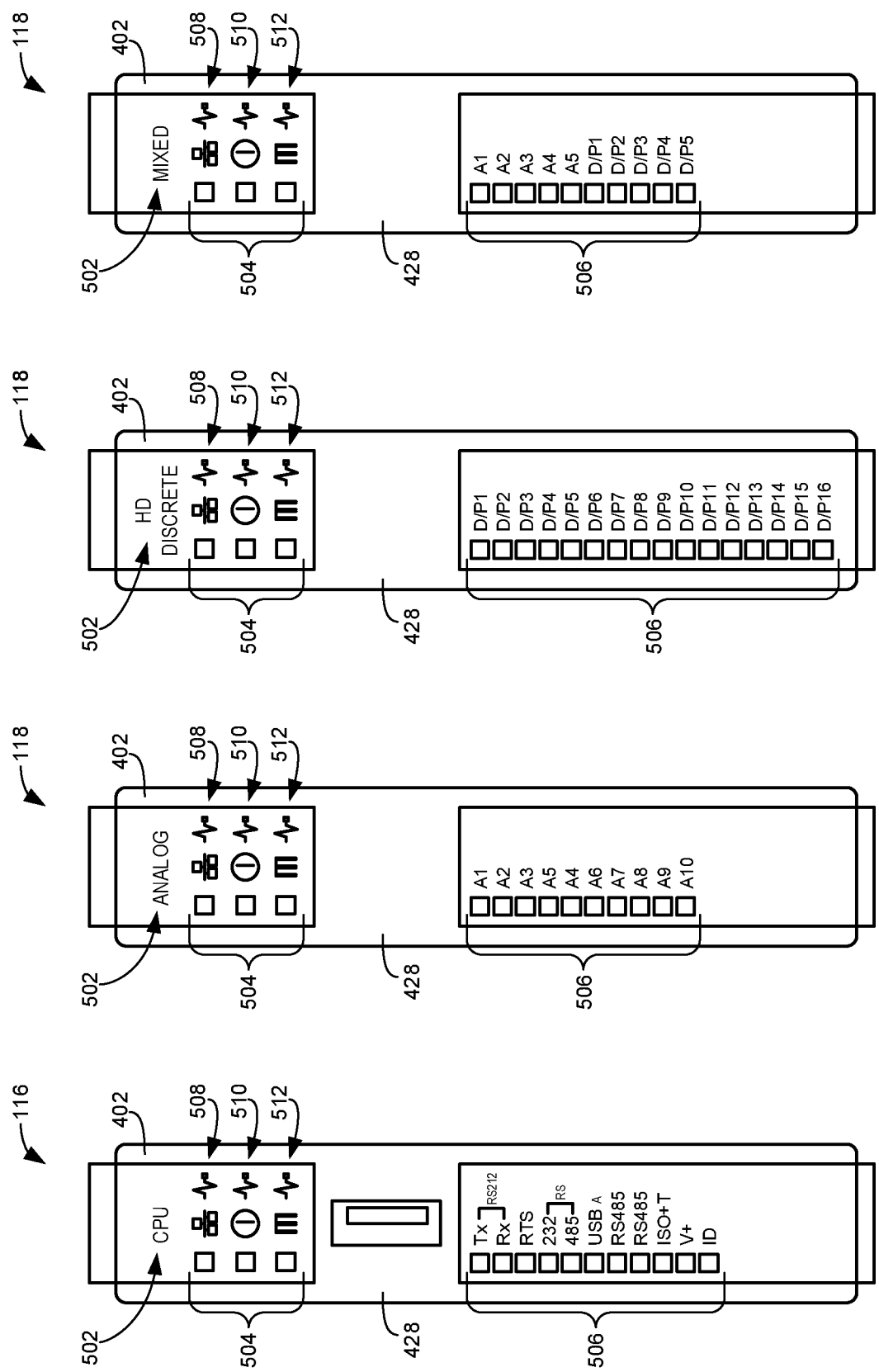

METHODS AND APPARATUS TO COMMUNICATIVELY COUPLE FIELD DEVICES TO A REMOTE TERMINAL UNIT

RELATED APPLICATIONS

This patent arises as a continuation of U.S. patent application Ser. No. 15/168,827, entitled "Methods and Apparatus to Communicatively Couple Field Devices to a Remote Terminal Unit," which was filed on May 31, 2016. The foregoing U.S. patent application is hereby incorporated herein by reference in its entirety.

Further, this patent is related to U.S. patent application Ser. No. 15/168,461, entitled "Methods and Apparatus to Implement Communications via a Remote Terminal Unit," which was filed on May 31, 2016, and which is hereby incorporated herein by reference in its entirety.

FIELD OF THE DISCLOSURE

This disclosure relates generally to process control systems, and, more particularly, to methods and apparatus to communicatively coupled field devices to a remote terminal unit.

BACKGROUND

Industrial control systems, like those used in the oil and gas production industry, frequently include one or more remote terminal units (RTUs) and/or flow computers as key components in an operating process unit of a control system (e.g., at a wellhead oil production site). RTUs are used to interface a control system host with field devices (e.g., valves, valve positioners, switches, sensors, transmitters, etc.) configured to perform control functions such as opening or closing valves and measuring process parameters. RTUs enable this interface by communicating commands from the host to the field devices and by communicating data sent by the field devices back to the host. Such communications may be implemented via any of analog, digital, or combined analog/digital buses using any desired communication media (e.g., hardwired, wireless, etc.) and protocols (e.g., Fieldbus, Profibus®, HART®, etc.). Additionally or alternatively, RTUs may act as standalone devices that implement process control and data archiving independent of commands provided by the host (and/or without connection to the host).

SUMMARY

Methods and apparatus to communicatively coupled field devices to a remote terminal unit are disclosed. The example apparatus includes a base rack for a remote terminal unit in a process control system. The example apparatus further includes a first termination module to be inserted in a first termination slot of the base rack. Wires communicatively coupled to a field device are to be terminated on the first termination module. The example apparatus also includes a first control module separate from the first termination module to be inserted in a first control slot of the base rack. The first control module is to be communicatively coupled with the first termination module via a backplane of the base rack. The first control module is to control communications with the field device.

An example method includes monitoring, via a processor in a control module, an identification signal provided by a termination module when the control module and the termination module are communicatively coupled via a backplane of a base rack supporting the control module and the termination module. The example method further includes automatically identifying, via the processor, a type of the termination module based on the identification signal.

A tangible computer readable storage medium includes example instructions that, when executed, cause a machine to at least monitor an identification signal provided by a termination module when the termination module is communicatively coupled to a control module via a backplane of a base rack supporting the control module and the termination module. The example instructions further cause the machine to automatically identify a type of the termination module based on the identification signal.

BRIEF DESCRIPTION OF THE DRAWINGS

FIGS. 5-8 illustrate example front faces of different types of the example control modules of FIG. 4

The figures are not to scale. Further, wherever possible, the same reference numbers will be used throughout the drawing(s) and accompanying written description to refer to the same or like parts.

DETAILED DESCRIPTION

Figure 1:
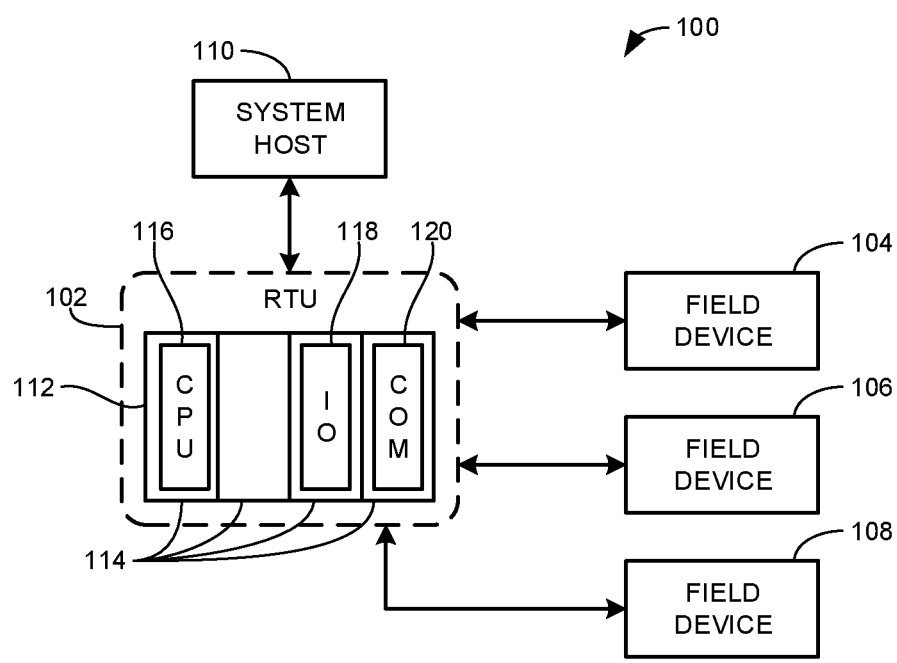
FIG. 1 illustrates a portion of an example control system within which the teachings of this disclosure may be implemented.

Remote terminal units (RTUs) and/or flow computers enable the communication of data between field devices and/or other components and a supervisory control and data acquisition (SCADA) system, a distributed control system (DCS), or any other control system. For convenience of explanation, as used herein, an RTU refers to either an RTU or a flow computer. Further, as used herein, a SCADA system, a DCS, or a process control system are used interchangeably to refer to any type of control system. In a process control system, an operator and/or other personnel may monitor and/or control various operating process units and/or other aspects of the control system via a central host. To enable an operator to monitor and/or control a control system in this manner involves the communication of data between the host and the process units and/or the other aspects of the control system.

Often, RTUs include a backplane to communicatively interconnect a local processor with one or more communication and/or input/output (I/O) cards or modules that are, in turn, communicatively coupled to one or more field devices and/or other components. Typically, each different type of I/O point to be implemented in a system (e.g., based on the type and/or application of the field devices involved, the power requirements, the communication protocol being used, etc.) requires a different type of I/O module. As a result, control system personnel may need access to a broad array of such I/O modules, which can involve substantial costs. Furthermore, in some examples, different types of I/O modules may be part of different product lines such that some may be implemented on one type of chassis or rack while others are implemented on a different rack. Thus, additional costs may be incurred to acquire and have access to the different types of racks and/or other components necessary to implement the different I/O modules.

Further, known I/O modules are typically self-contained components that include all of the electronics to implement the specified functionality as well as termination points into which wires from field devices may be directly landed. As a result, if there is a need to replace a particular I/O module because, for example, the electronics were damaged due to an electrical surge, the full cost of a new I/O module must be incurred. Furthermore, additional costs may be incurred due to the downtime associated with rewiring the field devices and configuring the new I/O module.

Examples disclosed herein overcome the above-limitations with a chassis or base rack that interfaces a first set of cards (referred to herein as control modules) with a second set of cards (referred to herein as termination modules) via a backplane of the rack. In some examples, ones of the control modules operate in combination with corresponding ones of the termination modules to implement similar functions performed by known I/O modules. In some examples, the control modules provide the primary control of communications with field devices while the termination modules provide the termination points onto which wires from the field devices are landed. More particularly, in some examples, the control modules include electronics to implement relatively high-level or generic functions corresponding to the core functionality and processing of traditional I/O modules. Furthermore, in some examples, the termination modules include conditioning circuitry that provides application-specific functionality that can characterize or condition the generic functionality of a control module for a particular use. In this manner, a single control module may be used for multiple different purposes by being paired with different types of the termination modules. The relatively specific functionality of termination modules can be produced at much less cost than the more generic control modules. As a result, the costs incurred to implement different types of I/O can be significantly reduced.

Furthermore, electric surges are a leading cause of field failures. Accordingly, in some examples, the specific functionality of the termination modules is to provide surge protection to the control module. That is, while an overvoltage or surge may damage the electronics of the termination module, the surge will not reach the control module. As a result, only the low cost termination module may need replacing, thereby further reducing the costs of operating an RTU in a control system. Also, in some such examples, the configuration of the control module may be retained for use with a replacement termination module, thereby reducing downtime and saving additional costs.

Further still, in some examples, the termination module includes a terminal block onto which field wires are terminated that is selectively separable from a board containing the conditioning circuitry (e.g., the surge protection). Accordingly, in some examples, the terminal block with all field wires attached may be removed from a failed board and inserted into a replacement board, thereby saving the time (and associated costs) needed to rewire the field devices.

While the separation of control modules from termination modules can enable multiple different combinations for different applications, some types of termination modules may be incompatible with some types of control modules. In the past, the matching of I/O components has been achieved through a physical keying mechanism (e.g., incompatible components are constructed so as not to fit together). This is one reason for the different types of racks and/or other components that result in significant costs associated with a large parts list. In the examples disclosed herein, each different type of control module has the same form factor to fit into any control slot of a corresponding rack. Similarly, each different type of termination module has the same form factor to fit into any termination slot of a corresponding rack. In some examples, to prevent the mismatching of incompatible control modules and termination modules, the modules implement an electronic keying mechanism. That is, rather than using a physical key, in some examples, the control module includes a processor that is capable of uniquely identifying the type of termination module to which the control module has been paired based on a signal provided by the termination module. In some such examples, if the identified termination module is incompatible with the control module, an interrupt signal is generated that prevents communications.

Further, in some examples, the control module is configured to detect the insertion and/or removal of a termination module when the system is powered. In some examples, the control module generates an interrupt signal that automatically prevents I/O communications in such situations such that there is no need for the RTU to be shut down or taken out of service during a module replacement, thereby further reducing the downtime.

Turning in detail to the drawings, FIG. 1 illustrates a portion of an example control system 100 (e.g., a SCADA system) within which the teachings of this disclosure may be implemented. The example system 100 includes an RTU 102. In the illustrated example, the RTU 102 is in communication with one or more field devices 104, 106, 108. Additionally, as illustrated in FIG. 1, the RTU 102 is also in communication with a system host 110 associated with the example system 100. In the illustrated example, communications between the RTU 102 and the system host 110 may be accomplished via any suitable communications device and/or medium. For example, the RTU 102 may include and/or be coupled to a wireless radio. As used herein, the term radio refers to any of a wireless transmitter or a wireless receiver either separately or in combination.

The example system host 110 of FIG. 1 allows an operator, engineer, and/or other plant personnel (any of which may be referred to herein as a user) to review and/or interact with one or more operator display screens and/or applications that enable the user to view system variables, states, conditions, and/or alarms associated with the example control system 100; change control settings (e.g., set points, operating states, clear alarms, silence alarms, etc.) for the example control system 100; configure and/or calibrate devices within the example control system 100; perform diagnostics of devices within the example control system 100; and/or otherwise interact with devices within the example control system 100.

The example system host 110 of FIG. 1 may be implemented using one or more workstations and/or any other suitable computer systems and/or processing systems. For example, the system host 110 could be implemented using single processor personal computers, single or multi-processor workstations, a portable laptop computer, etc. The system host 110 may be configured with one or more application stations to perform one or more information technology applications, user-interactive applications and/or communication applications. For example, an application station may be configured to perform primarily process control-related applications, while another application station may be configured to perform primarily communication applications that enable the control system 100 to communicate with other devices or systems using any desired communication media (e.g., wireless, hardwired, etc.) and protocols (e.g., HTTP, SOAP, etc.).

As shown in the illustrated example of FIG. 1, the RTU 102 includes at least one rack or chassis 112 with a plurality of ports, connectors, or slots 114 to hold different types of modules including at least one central processing unit (CPU) module 116 through which the functionality of the RTU 102 is implemented. In some examples, other ones of the slots 114 hold one or more input/output (I/O) modules 118 and/or one or more communications (COM) modules 120 through which the RTU 102 interfaces with other components within the control system 100 (e.g., the field devices 104, 106, 108). In some examples, each of the slots 114 (and the corresponding modules 116, 118, 120 inserted therein) are in communication with one another via a backplane constructed in the rack 112 of the RTU 102. The CPU module 116 of the RTU 102 may be in communication with the system host 110 of the example control system 100 (e.g., via a wireless long haul radio, a cellular network, a satellite link, etc.).

As shown in the illustrated example, the RTU 102 is communicatively coupled to one or more of the field devices 104, 106, 108. In some examples, at least some of the example field devices 104, 106, 108 may be smart field devices such as Fieldbus compliant valves, actuators, sensors, etc., in which case the smart field devices 104, 106, 108 communicate with the RTU 102 via one of the I/O modules 118 using the well-known Foundation Fieldbus protocol via any of wired or wireless communications media. Of course, other types of smart field devices and communication protocols could be used instead. For example, the smart field devices 104, 106, 108 could instead be Profibus® and/or HART® compliant devices that communicate with the RTU 102 using the well-known Profibus® and HART® communication protocols. Additionally or alternatively, in some examples, the field devices 104, 106, 108 may be communicatively coupled over a local wireless network in accordance with the WirelessHART™ protocol. In some such examples, the RTU 102 may pass through information and/or data from the system host 110 to a WirelessHART™ interface module to communicate with the local wireless network of field devices. Further, in other examples, at least some of the field devices 104, 106, 108 may be non-smart field devices such as conventional 4-20 milliamp (mA) or 0-24 volts direct current (VDC) devices that communicate with the RTU 102 via a respective hardwired link.

While FIG. 1 illustrates an example process control system 100 within which the RTU 102, described in greater detail below, may be implemented, the methods and apparatus described herein may, if desired, be advantageously employed in other SCADA and/or process control systems of greater or less complexity (e.g., having more than one RTU, having other controllers, having more field devices, etc.) than the illustrated example of FIG. 1.

Figure 2:
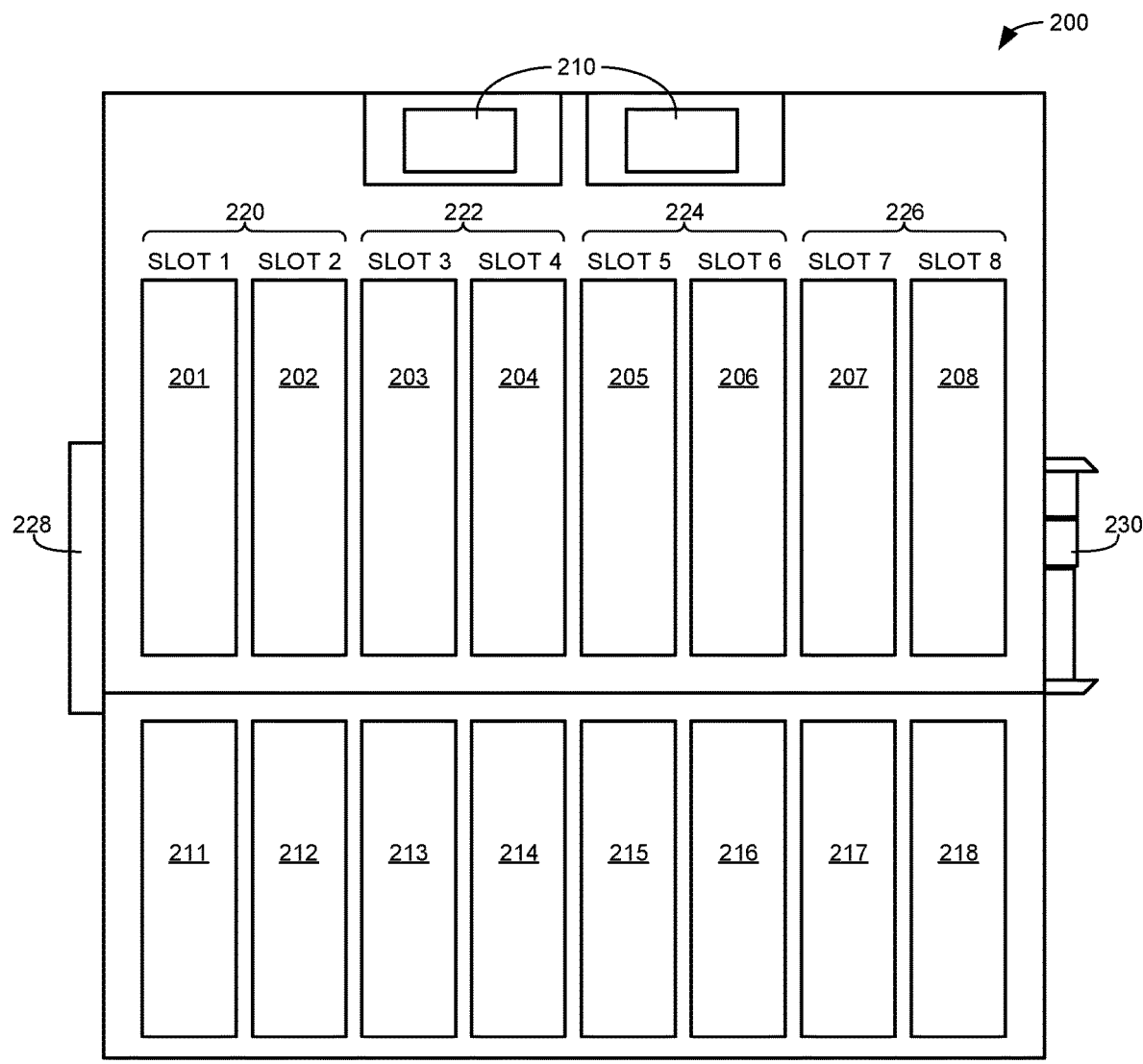
FIG. 2 illustrates an example rack or chassis to implement the example RTU of FIG. 1.

FIG. 2 illustrates an example base rack or chassis 200 (similar to the rack 112 of FIG. 1) to implement the example RTU 102 of FIG. 1. In some examples, the rack 200 has no active electronics and may be mounted inside a field enclosure, either directly to a plate or via a DIN rail. As shown in the illustrated example, the rack 200 includes eight control slots 201, 202, 203, 204, 205, 206, 207, 208 to receive up to eight control modules (e.g., the control modules 402 of FIG. 4) corresponding to any one of a CPU module 116, an I/O module 118, or a COM module 120 described above in FIG. 1. Further, the example rack 200 includes two power input connectors 210 that provide power to the control modules inserted in the control slots 201-208. Further, the example rack 200 of FIG. 2 includes eight termination slots 211, 212, 213, 214, 215, 216, 217, 218 to receive up to eight termination modules (e.g., the termination modules 404 of FIG. 4) that operate in combination with corresponding ones of the control modules to provide the functionality to interface the field devices 104, 106, 108 of FIG. 1 with the host system 101 via the RTU 102. In some examples, the first one of the slots 201 (slot number 1) is designated as a master slot for the rack 200. In some such examples, the master slot 201 is to receive a control module that is a CPU module 116 to direct and control the functionality of the RTU 102 and communicate with additional control modules in the other slots 202-208. For purposes of explanation, the CPU module 116 inserted in the master slot 201 is referred to herein as a master CPU module.

In some examples, as described more fully below, the control modules (inserted in the control slots 201-208) provide the core functionality to implement and/or control I/O communications with the field devices and to communicate with other control modules on the rack 200 including the master CPU module (which, in turn, communicates with the system host 110). In some examples, the termination modules include termination points for terminating wires from the field devices. In some examples, control modules inserted in the control slots 201-208 are communicatively coupled, via a backplane of the rack 200, with corresponding termination modules inserted in the termination slots 211-218. Thus, in some examples, the control modules communicate indirectly with field devices (e.g., the field devices 104, 106, 108) via the backplane and the termination modules. Additionally, in some examples, the termination modules include application-specific circuitry to condition signals between the field devices and the control modules for particular purposes.

In some examples, in addition to interfacing corresponding ones of the control modules with the termination modules, the backplane of the rack 200 enables communications between different control modules installed in different ones of the slots 201-208. In some examples, the backplane and associated control module connectors are the same for each control slot such that any control module can be inserted in any slot. In some examples, the backplane of the rack 200 enables the eight control slots 201-208 to be configured into four redundant pairs 220, 222, 224, 226 with odd numbered slots (slot number 1, 3, 5, and 7) being redundant with adjacent even numbered slots (slot numbers 2, 4, 6, and 8). In some examples, the odd numbered control slots are the default active slots in the redundant pairs 220, 222, 224, 226 while the even numbered control slots are the default standby or backup slots that become active if there is a failure of a control module in the corresponding control slot. Although the backplane of the rack 200 enables the slots 201-208 to be configured into redundant pairs 220, 222, 224, 226, the slots 201-208 may alternatively be implemented in a non-redundant manner. That is, in some examples, all eight slots 201-208 may include eight different modules that are active.

As shown in the illustrated example, the rack 200 includes an entry connector 228 and an exit connector 230 (generally referred to herein as rack-to-rack connectors) that are communicatively interconnected via the backplane of the rack 200. In some examples, the exit connector 230 of a first rack 200 may be interconnected with the entry connector 228 of a second rack 200. That is, in some examples, multiple racks 200 may be coupled in series with their associated backplanes communicatively interconnected, thereby enabling control modules on any one of the racks to communicate with each other. As used herein, two or more racks 200 communicatively interconnected via the entry and exit connectors 228, 230 are collectively referred to herein as a panel. In some examples, a single master CPU module controls the operation and functioning of all modules inserted into a panel regardless of the particular rack 200 into which the module is inserted.

Figure 3:
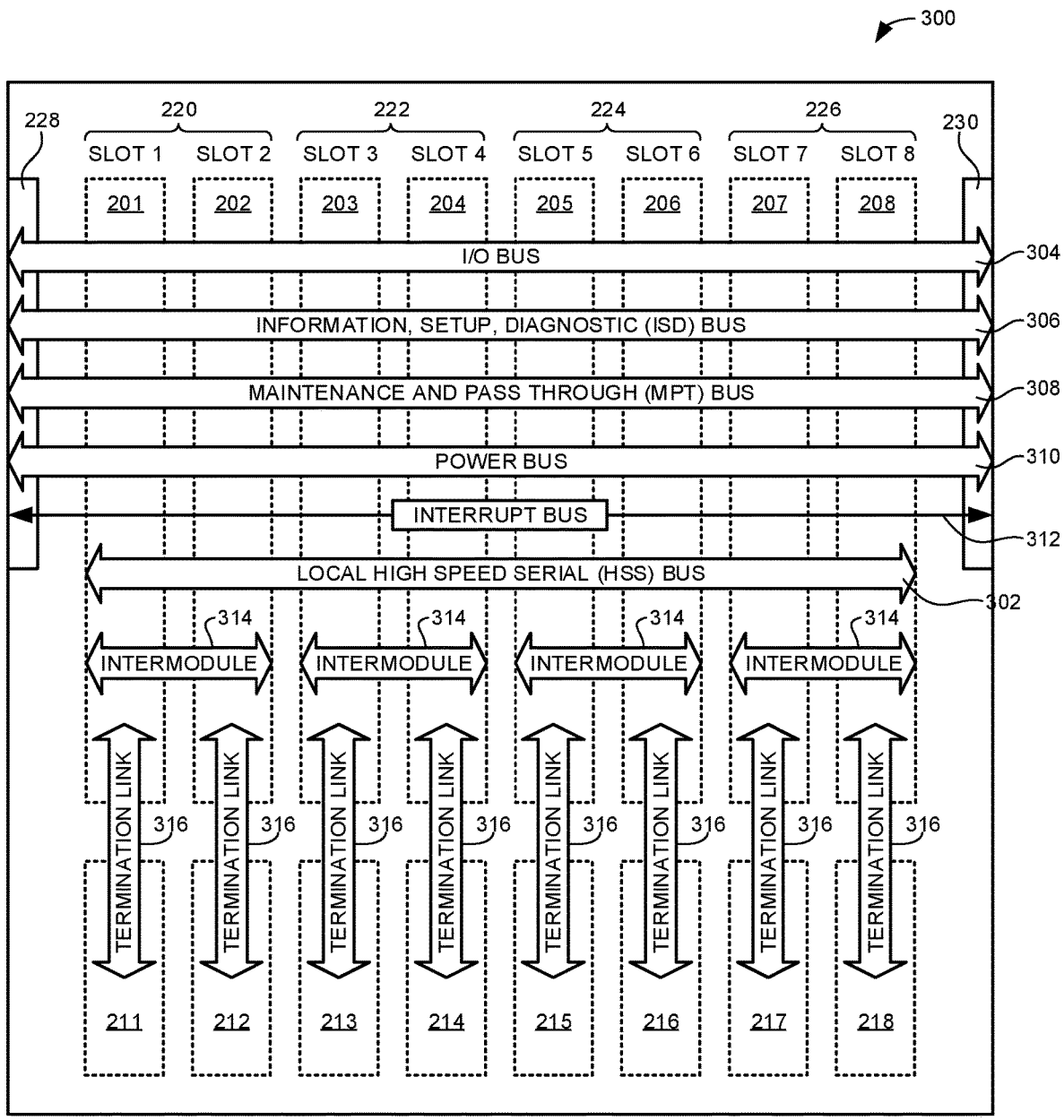
FIG. 3 illustrates a schematic of an example backplane of the example rack of FIG. 2.

FIG. 3 illustrates a schematic of an example backplane 300 communicatively interconnecting all of the control slots 201-208 of the example rack 200 of FIG. 2. As shown in FIG. 3, the backplane 300 provides a local high speed serial (HSS) bus 302 that is internal to the rack 200 (i.e., the local HSS bus 302 does not pass through the entry and exit connectors 228, 230 to other connected racks). Additionally, the example backplane 300 includes three other communication buses including an I/O bus 304, an Information, Setup, and Diagnostic (ISD) bus 306, and a Maintenance and Pass-Through (MPT) bus 308. Unlike the local HSS bus 302, each of the I/O bus 304, the ISD bus 306, and the MPT bus 308 connect with entry and exit connectors 228, 230 such that each of the buses may extend through multiple racks 200 connected in series. Accordingly, the I/O bus 304, the ISD bus 306, and the MPT bus 308 are collectively referred to herein as rack-to-rack communication buses.

In some examples, the I/O bus 304 is used for the transmission of input and output dynamic data referred to herein as I/O data. As used herein, I/O data corresponds to control signals sent to the field devices 104, 106, 108 and/or feedback obtained from the field devices 104, 106, 108 associated with the operation and control of the control system 100. The transmission of I/O data is often time-critical with the need for real-time or substantially real-time updates. Accordingly, in some examples, the I/O bus 304 is dedicated exclusively to the transmission of I/O data, while all other types of data transmissions (discussed below) are transmitted using other ones of the buses. This increases the likelihood that there will always be sufficient bandwidth for real-time or substantially real-time I/O data updates.

In the illustrated example of FIG. 3, the ISD bus 306 is used for the transmission of information that is not time critical including configuration or setup data, diagnostic data, product information data, archival data, and/or other types of non-real-time data. In the illustrated example, the MPT bus 308 is used for the transmission of maintenance data corresponding to the transmission of firmware updates and the retrieval of maintenance logs. Additionally or alternatively, the MPT bus 308 is used for the transmission of pass-through data corresponding to data passed directly through (e.g., without the intervention of) the master CPU module between the system host 110 and a control module in one of the other control slots.

As shown in the illustrated example of FIG. 3, in addition to the various communication buses (e.g., the local HSS bus 302, the I/O bus 304, the ISD bus 306, and the MPT bus 308), the backplane 300 includes a power bus 310 to distribute input power (from the power input connectors 210 of FIG. 2) to the control modules inserted in the control slots 201-208. Further, in some examples, the example backplane 300 includes an interrupt bus 312, which is a one signal bus that provides a signal (an interrupt) to the master CPU module 116 when a control module is inserted under power. Additionally or alternatively, in some examples, an interrupt signal is also generated and transmitted via the interrupt bus 312 when a control module is removed from a control slot while the control module is powered. Further, in some examples, an interrupt signal is generated and transmitted via the interrupt bus 312 in response to a termination module being installed and/or removed while powered.

In some examples, the backplane 300 enables module-to-module communications between redundant modules installed in the redundant pairs 220, 222, 224, 226 of the control slots 201-208 over an intermodule link 314. In some examples, such communications include a status signal indicative of whether the module in the primary control slot (the odd numbered control slot in the illustrated example) or the secondary control slot (the even numbered control slot) has control (e.g., is active). Additionally or alternatively, in some examples, the intermodule link 314 of the backplane 300 is implemented as a universal serial bus (USB) link that enables the synchronization of redundant modules to be maintained. That is, in some examples, the dynamic variables and database of the modules are synced using the USB link. Further, in some examples, the USB link is used to compare I/O values of the redundant pair of modules in substantially real-time to detect and/or warn of deviations. Further still, the secondary module (e.g., the backup module in the secondary control slot) may use the USB link to monitor the primary module to determine whether the primary module has failed and switchover needs to occur.

Additionally, as shown in the illustrated example of FIG. 3, the backplane 300 includes a termination link 316 that provides a communication interface between each control slot 201-208 and a corresponding termination slot 211-218.

In this manner, a control module inserted in any one of the control slots 201-208 is enabled to communicate with a termination module inserted in a corresponding one of the termination slots 211-218. In some examples, the termination link 316 on the backplane provides a one-to-one connection between corresponding connector pins on the backplane connectors of each of the control modules and the termination modules.

Figure 4:
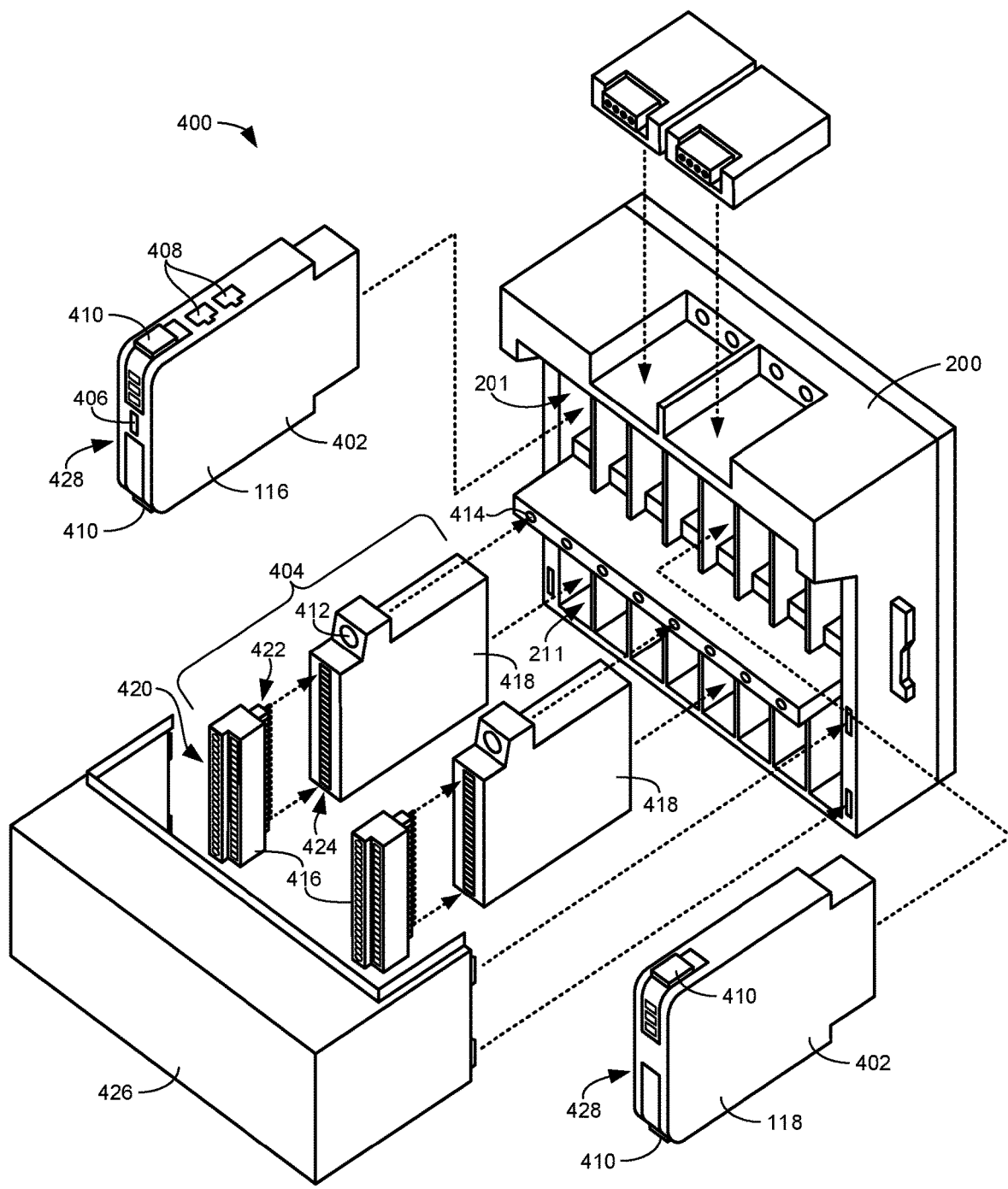
FIG. 4 illustrates an exploded perspective view of an example assembly showing the example rack of FIG. 2 with two example control modules and two corresponding example termination modules.

FIG. 4 illustrates an exploded perspective view of an example assembly 400 showing the example rack 200 of FIG. 2 with two example control modules 402 and corresponding termination modules 404. As mentioned above, in some examples, the control module 402 to be inserted in the first slot 201 is a master CPU module 116 to communicate with the system host 110 and to direct the operation of other control modules 402 installed in the other control slots of the rack 200. The other control module 402 (to be inserted in the fifth control slot 205 in the illustrated example) may be any one of a CPU module 116, an I/O module 118, or a COM module 120. As shown in the illustrated example, the control modules 402 are the same size and have the same backplane connector configuration to fit in any slot of the backplane regardless of whether the control module 402 is a CPU module 116, an I/O module 118, or a COM module 120. For purposes of explanation, the second control module 402 will be described as an I/O module 118.

As shown the illustrated example, the CPU modules 116 include an external USB port 406 and two Ethernet ports 408 to enable communications and/or networking with external components and/or other CPU modules in other racks. In some examples, the CPU modules 116 may have more or fewer USB ports 406 and/or Ethernet ports 408 than shown in FIG. 4. Although the I/O module 118 does not have external communication ports in FIG. 4, in some examples, either the I/O modules 118 or the COM modules 120 may also have USB ports and/or Ethernet ports similar to the CPU modules 116. Furthermore, in some examples, any of the control modules may have other types of external communication ports, such as, for example, antenna connectors for wireless I/O modules. In some examples, the COM modules 120 are capable of communications via multiple protocols over physical connections via a corresponding termination module 404.

In some examples, the control modules 402 include one or more latches 410 that a user physically depresses to insert the control module 402 into and/or remove the control module 402 from one of the control slots. In some examples, the latches 410 hold the control modules securely in place within the corresponding control slots. Thus, in some examples, the control modules 402 may be inserted or removed without the use of tools. Furthermore, in some examples, pressing the latches 410 on an I/O module 118 that is operating in a control slot triggers an interrupt signal to be sent to the master CPU module (via the backplane) to indicate that the I/O module 118 is about to be removed. In this manner, I/O scanning and/or other communications between the master CPU module 116 and the I/O module 118 can be stopped before the I/O module is actually removed to reduce the likelihood of bad data being collected. Thus, the interrupt signal triggered by the latches 410 enables live removal of a control module from a corresponding control slot (e.g., removal under power with the system in operation).

As with the control modules 402, in some examples, the termination modules 404 are independently separable from the rack 200. In some examples, the termination modules 404 are held in place (in communication with the backplane of the rack 200) via a lock or fastener 412 (e.g., a screw) that engages a hole 414 in the housing of the rack 200. The separation of the termination modules 404 from the control modules 402 enables the isolation and protection of field wiring and transient currents that can affect the electronics within the control modules 402. More particularly, in some examples, the termination modules 404 provide surge protection for the control modules 402. In such examples, while a power surge may damage the termination modules 404 (necessitating replacement), the relatively more expensive control modules 402, with higher level functionality, are protected, thereby saving costs.

Furthermore, inasmuch as the termination modules 404 are separate from the control modules 402 (e.g., each has a separate housing that is separately connected to the backplane of the rack 200), a faulty or damaged termination module 404 may be removed and replaced with a new termination module 404 without removing the corresponding control module 402. In this manner, the repair time can be significantly reduced because there is no need to reconfigure the control module 402 as the initial configurations are retained by the control module 402 and are unaffected by the change in a termination module 404. Furthermore, in some examples, the termination module 404 may be removed and replaced when the system is operating under power rather than being taken out of service for repairs. In some such examples, the removal of a termination module 404 is detected by the associated control module 402 to trigger an interrupt signal transmitted to the master CPU module to prevent I/O scanning and/or other communications until a new termination module 404 is installed to restore communications.

As shown in the illustrated example of FIG. 4, each of the termination modules 404 includes a terminal block 416 and a signal conditioning card 418. In some examples, the terminal block 416 includes termination points 420 to terminate wires from field devices (e.g., the field devices 104, 106, 108 of FIG. 1) and/or other components in the control system 100. In the illustrated example, the terminal block 416 includes 20 termination points 420 for 10 I/O channels (2 terminations per channel). However, in other examples, a different number of termination points 420 may alternatively be implemented (e.g., 10, 12, 16, 24, etc.). In some examples, the terminal block 416 includes first module connectors 422 that communicatively couple with second module connectors 424 in the signal conditioning card 418. That is, in some examples, the terminal block 416 is selectively separable from the signal conditioning card 418. In this manner, a user may remove and replace a faulty or damaged signal conditioning card 418 with a new signal conditioning card 418 without removing the wires terminated on the terminal block 416, thereby further simplifying the repair process.

In some examples, the signal conditioning card 418 includes a printed circuit board assembly (PCBA) enclosed within a housing that may be communicatively coupled to the terminal block 416 and the backplane of the rack 200. In some examples, the PCBA includes circuitry that provides the surge protection noted above. The particular configuration of the surge protection circuit may vary from one termination module 404 to another based on the particular type (functionality) of control module 402 to which the termination module 404 is to be communicatively coupled. Additionally or alternatively, in some examples, the PCBA includes circuitry to condition signals transmitted between field devices (or other components) wired to the terminal block 416 and the corresponding control module 402 (via the backplane of the rack 200) to provide enhanced functionality to a corresponding control module 402. For instance, some example termination modules 404 include conditioning circuits (in the signal conditioning card 418) with high current components, such as relays, high side drivers, low side drivers, and/or a triode for alternating current (TRIAC) to isolate pass-through communications to the control module 402 while preventing high current signals from reaching the backplane 300 of the rack 200. Additionally or alternatively, some example termination modules 404 include conditioning circuits (in the signal conditioning card 418) that provide voltage translation, isolation, low level pulse input amplifiers, multi-volt level analog inputs, differential analog input pre-amplifiers or buffers, fusing or current limiting of outputs, and/or permissive enabled outputs. The different types of termination modules 404 (based on different types of conditioning circuitry) are described in greater detail below.

The different functionality offered by these different types of termination modules 404 (with different types of conditioning circuits) serve as an initial data filter and/or isolator that operates in combination with a corresponding control module 402. That is, each type of control module 402 disclosed herein corresponds to a component with relatively broad or generic applicability (e.g., analog I/O, discrete I/O, etc.) that may be characterized for different specific uses based on the particular conditioning circuitry provided in the corresponding termination module 404 communicatively coupled to the control module 402 via the backplane of the rack 200. Thus, in some examples, a particular type of control module 402 may operate in combination with several different types of termination modules 404 to provide several different types of functionalities. In this manner, an end user can implement a relatively broad array of function with a relatively limited number of unique modules at a reduced cost because individual control modules may be used for multiple different purposes when combined with relatively low cost termination modules 404 of a particular type. Furthermore, if a user desires to implement new and/or additional functions, rather than incurring the cost of acquiring a self-contained control module with the desired functions, the user can obtain a new termination module 404 that operates in combination with a generic control module 402 the user already owns.

Not all types of termination modules 404 are necessarily suitable for all types of control modules 402. Accordingly, in some examples, a termination module 404 and a corresponding control module 402 (when in communication via the rack backplane) implement an electronic keying methodology that enables the control module 402 to identify the type of termination module 404 (e.g., the type of conditioning circuitry provided on the PCBA of the signal conditioning card 418) to verify the compatibility of the particular termination module 404 in combination with the control module 402 and/or to verify the safe and/or correct joining of field wires to the control module 402. Electronic keying of the termination modules 404 is described in greater detail below in connection with FIGS. 10 and 24. In some examples, in addition to detecting the type of termination module 404, the electronic keying circuitry may be used to detect the initial insertion and/or subsequent removal of a termination module 404 when the system is operating under power. In some examples, the control module 402 detects when a termination module 404 is initially inserted in a corresponding termination slot of the rack 200 to trigger an interrupt signal that prevents communications until the control module 402 confirms that the type of termination module 404 is compatible with the control module 402.

As shown in the illustrated example of FIG. 4, the assembly 400 of the rack 200 includes a cover 426. In some examples, the cover 426 is constructed to cover the termination modules 404 to protect any wires landed in the termination points 420. Thus, in some such examples, the control modules 402 are exposed, including a front face 428 that may include visual indicators of the status and/or the type of the control modules 402. Example front faces 428 of different types of control modules 402 are shown in greater detail in FIGS. 5-8, including the front face 428 of an example CPU module 116 (FIG. 5) and the front face 428 of three different types of I/O modules 118 (FIGS. 6-8). As shown in the illustrated examples, the front faces 428 of the control modules 402 include a label 502 identifying the type of each control module 402. The example I/O modules 118 of the illustrated examples include an analog I/O module (FIG. 6), a high density discrete I/O module (FIG. 7), and a mixed analog/discrete I/O module (FIG. 8).

In the illustrated examples, each control module 402 includes operation status indicators 504 and field terminal status indicators 506. In some examples the status indicators 506 are implemented using light emitting diodes (LEDs). In some examples, the operation status indicators 504 provide a control module status indicator 508, a communication status indicator 510, and a termination module status indicator 512. The control module status indicator 508 indicates the status of the control module 402 (e.g., green=powered, red=fault, off=no power). The communication status indicator 510 indicates the status of the connection between the control module 402 and the backplane (e.g., green=backplane communications, red=fault, off=none). The termination module status indicator 512 indicates the compatibility and/or presence of a termination module 404 inserted in a termination slot corresponding to the control module 402 (e.g., green=compatible, red=not compatible, off=not installed or unrecognized). The field terminal status indicators 506 indicate the status of I/O connections and/or other field communications (e.g., green=active (for discrete I/O) or operational (for analog I/O), yellow=alarm, red=fault, off=inactive (for discrete I/O) or not installed/no signal (for analog I/O)).

As shown in the illustrated examples, the different types of control modules 402 have different types of field terminal status indicators 506. For example, the CPU module 116 (FIG. 5) includes indicators 506 for various communication channels with other control modules 402 (over the backplane of the rack 200) and with the system host 110. The example analog I/O module 118 (FIG. 6) includes indicators 506 corresponding to ten analog I/O channels. A digital or discrete I/O module may be similar except that the indicators would correspond to ten discrete I/O channels that may alternatively be used for pulse inputs. The example high density discrete I/O module 118 (FIG. 7) includes indicators 506 corresponding to sixteen discrete (or pulse) input channels. The example mixed analog/discrete I/O module 118 (FIG. 8) includes indicators 506 corresponding to five analog channels and five discrete channels. While the illustrated example I/O modules 118 show ten channels in a standard implementation (FIGS. 6 and 8) and sixteen channels in a high density implementation (FIG. 7), other implementations are possible with more or fewer channels. Further, in some examples, the number of analog and discrete channels in a mixed module may not be the same (e.g., implementing four of one and six of the other). Additionally or alternatively, in some examples, the I/O modules 118 may include a radio connection interface (with a corresponding indicator 506) to implement a distributed RTU (dRTU) system.

In addition to the different I/O modules 118 described above and shown in the illustrated examples, other types of I/O modules 118 may be implemented including a serial I/O module or a multi-variable sensor (MVS) I/O module that includes five RS232/RS485 channels. Some such examples may be implemented with isolated power. Another example type of I/O module 118 is a resistance temperature detector (RTD) module that may be used to implement four 4-wire RTDs. Another example type of I/O module 118 is a thermocouple module that may be used to implement an 8-channel thermocouple. Other types of I/O modules 118 may be implemented in accordance with the WirelessHART protocol.

While different types of control modules 402 have some differences in their electronics and associated functionality and implementation, the different types of control modules 402 may also have many common features and/or functions. For instance, as described above, in some examples, the different types of control modules 402 may include a similarly configured backplane connector to be inserted into any of the control slots 201-208 of the backplane of the rack 200. In this manner, any control module 402 can be communicatively coupled to a corresponding termination module 404 and also communicate with other control modules 402 inserted in other control slots in the rack 200. Further, in some examples, each control module 402 includes an early removal detection switch to trigger an interrupt signal if the control module 402 is removed under power (e.g., triggered by the latches 410).

Figure 9:
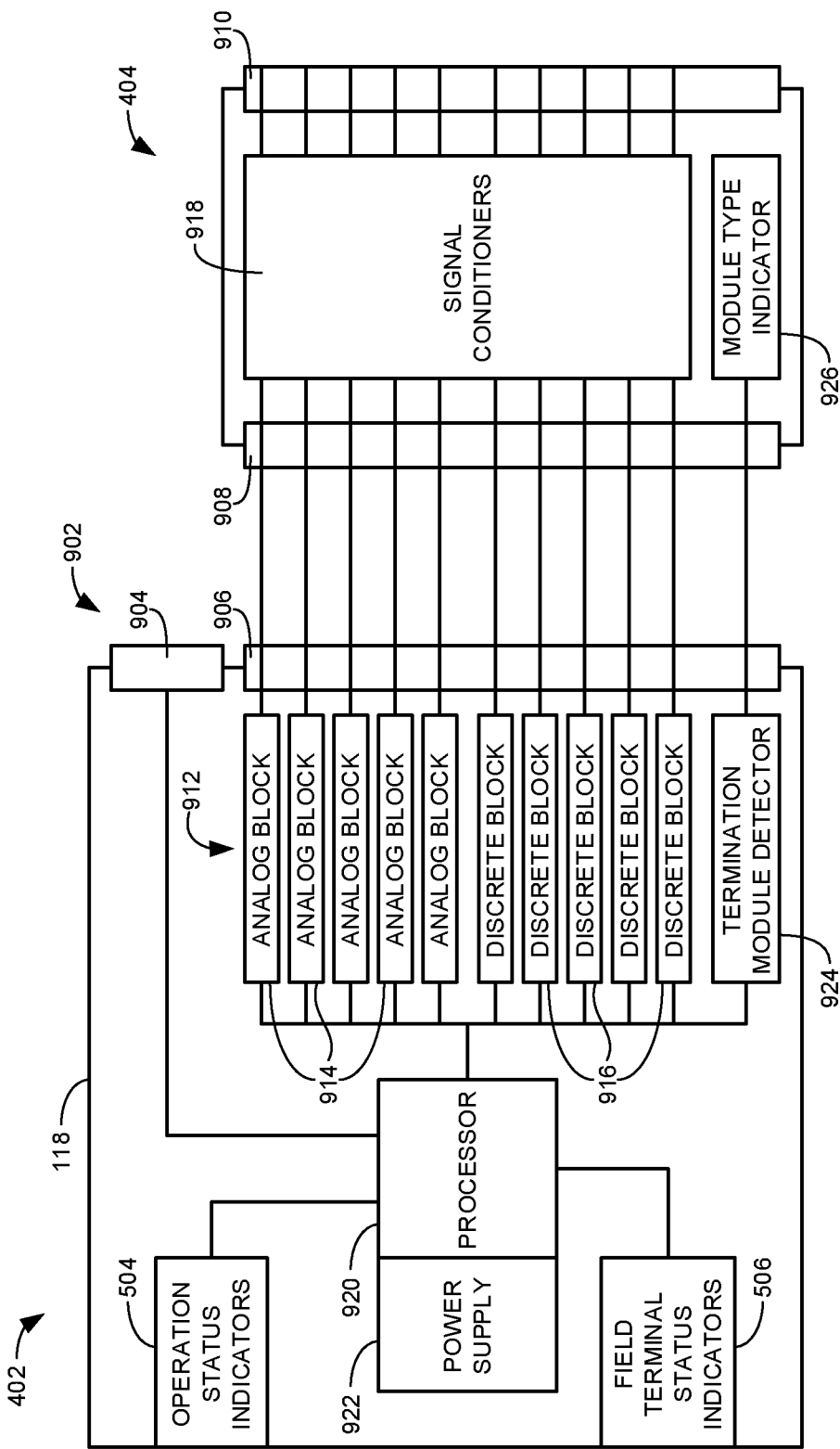
FIG. 9 is a block diagram illustrating an example implementation of one of the example control modules of FIG. 4 in communication with the corresponding example termination module of FIG. 4.

FIG. 9 is a block diagram illustrating an example implementation of a control module 402 in communication with a corresponding termination module 404. In the illustrated example, the control module 402 corresponds to a mixed I/O module 118 as shown in FIG. 8. As shown in FIG. 9, the example control module 402 includes a backplane connector 902 that includes a rack communications connector 904 and a termination module I/O signal connector 906. In some examples, the rack communications connector 904 interfaces with the communication and power buses on the rack 200 described above in connection with FIG. 3. In some examples, the termination module I/O signal connector 906 includes pins that interface with corresponding pins on a backplane connector 908 of the termination module 404. That is, the control module 402 and the termination module 404 are in communication via the backplane 300 of the rack 200 (which has been omitted for the sake of clarity) as described above. Further, the example termination module 404 includes a field termination connector 910 that enables wires from field devices and/or other components to be coupled to the termination module 404. In some examples, the field termination connector 910 corresponds to the separable terminal block 416 communicatively coupled to the module connectors 424 of the signal conditioning card 418 discussed above in connection with FIG. 4.

In some examples, the control module 402 includes a number of I/O blocks 912 that provide specific functionality for each I/O channel associated with the control module 402. In the illustrated example of FIG. 9, the I/O blocks 912 include an analog block 914 for each analog channel of the control module 402 and a discrete block 916 for each discrete channel of the control module 402. Further detail regarding the implementation of the analog blocks 914 and the discrete blocks 916 is provided below in connection with FIGS. 11 and 12. Other types of I/O blocks 914 may be included in other types of termination modules 404. For example, an analog I/O module may include only analog blocks 914 while a discrete I/O module may include only discrete blocks 916. Furthermore, control modules 402 for different types of signals as described above (e.g., a serial I/O module, a multi-variable sensor I/O module, an RTD module, a thermocouple module, etc.) may be suitably adapted with appropriate I/O blocks 912 to implement the desired functionality.

As shown in FIG. 9, the I/O blocks 912 are communicatively coupled with the termination module 404 to interface with field devices and/or other components that have wires landed on the field termination connector 910 of the termination module 404. As shown in the illustrated example, signals transmitted between the I/O blocks 912 and field devices connected to the field termination connector 910 pass through signal conditioners 918 within the termination module 404. While the signal conditioners 918 are represented in FIG. 9 with a single block, in some examples, each signal path (corresponding to each I/O block 912 of the control module 402) is associated with a separate signal conditioner. In some such examples, the separate signal conditioners include different types of circuitry to provide different types of conditioning of the signals transmitted between field devices and the control module 402. The signal conditioners 918 are described in greater detail below in connection with FIGS. 16-22.

In some examples, the control module 402 (which, in FIG. 9, is an I/O module 118) includes a processor 920 and a corresponding power supply 922. Thus, while a CPU module 116 may have more processing power than the other control modules (e.g., I/O modules 118 or COM modules 120), in some examples, I/O modules 118 (as well as COM modules 120) include a relatively low cost processor (e.g., a K61 series CPU). As shown in the illustrated example, the processor 920 and power supply 922 are in communication with the I/O blocks 912 to control communications with particular field devices associated with corresponding ones of the I/O blocks 912.

Additionally, in some examples, the processor 920 within the control module 402 enables each control module 402 to detect the insertion and/or removal of the termination module 404 in the rack 200 and to determine a compatibility of the termination module 404 through the implementation of an electronic keying circuitry. In some examples, the processor 920 provides signals indicative of such information (as well as other status information) to the operation status indicators 504 and the field terminal status indicators 506 (FIGS. 5-8). In some examples, the electronic keying to detect the termination module 404 and/or to determine its compatibility with the control module 402 is based on signals generated by the interfacing of a termination module detector 924 in the control module 402 with a module type indicator 926 in the termination module 404. More particularly, in some examples, the module type indicator 926 is implemented differently for each different type of termination module 404. As a result, when the module type indicator 926 interfaces with the termination module detector 924, a unique signal is generated and provided to the processor 920 that is distinguishable from corresponding signals generated when the control module 402 is communicatively coupled with different types of termination modules 404. Thus, if a particular type of termination module 404 is detected that is not compatible with the particular type of control module 402, the processor 920 can determine the incompatibility of the modules 402, 404 and prevent signals from being transmitted therebetween. This electronic keying mechanism is described in greater detail below in connection with FIGS. 10 and 24.

While an example manner of implementing the control module 402 of FIG. 4 is illustrated in FIG. 9, one or more of the elements, processes and/or devices illustrated in FIG. 9 may be combined, divided, re-arranged, omitted, eliminated and/or implemented in any other way. Further, the example operation status indicators 504, the example field terminal status indicators 506, the example I/O blocks 912, the example processor 920, the example power supply 922, the example termination module detector 924, and/or, more generally, the example control module 402 of FIG. 9 may be implemented by hardware, software, firmware and/or any combination of hardware, software and/or firmware. Thus, for example, any of the example operation status indicators 504, the example field terminal status indicators 506, the example I/O blocks 912, the example processor 920, the example power supply 922, the example termination module detector 924, and/or, more generally, the example control module 402 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example operation status indicators 504, the example field terminal status indicators 506, the example I/O blocks 912, the example processor 920, the example power supply 922, and/or the example termination module detector 924 is/are hereby expressly defined to include a tangible computer readable storage device or storage disk such as a memory, a digital versatile disk (DVD), a compact disk (CD), a Blu-ray disk, etc. storing the software and/or firmware. Further still, the example control module 402 of FIG. 9 may include one or more elements, processes and/or devices in addition to, or instead of, those illustrated in FIG. 9, and/or may include more than one of any or all of the illustrated elements, processes and devices. In particular, while an example I/O module 118 is shown and described, different and/or additional circuitry or components may be included in CPU modules 116 and/or COM modules 120.

Similarly, while an example manner of implementing the termination module 404 of FIG. 4 is illustrated in FIG. 9, one or more of the elements, processes and/or devices illustrated in FIG. 9 may be combined, divided, re-arranged, omitted, eliminated and/or implemented in any other way. Further, the example signal conditioners 918, the example module type indicator 926, and/or, more generally, the example termination module 404 of FIG. 9 may be implemented by hardware, software, firmware and/or any combination of hardware, software and/or firmware. Thus, for example, any of the example signal conditioners 918, the example module type indicator 926, and/or, more generally, the example termination module 404 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example signal conditioners 918, and/or the example module type indicator 926 is/are hereby expressly defined to include a tangible computer readable storage device or storage disk such as a memory, a digital versatile disk (DVD), a compact disk (CD), a Blu-ray disk, etc. storing the software and/or firmware. Further still, the example termination module 404 of FIG. 9 may include one or more elements, processes and/or devices in addition to, or instead of, those illustrated in FIG. 9, and/or may include more than one of any or all of the illustrated elements, processes and devices.

Figure 10:
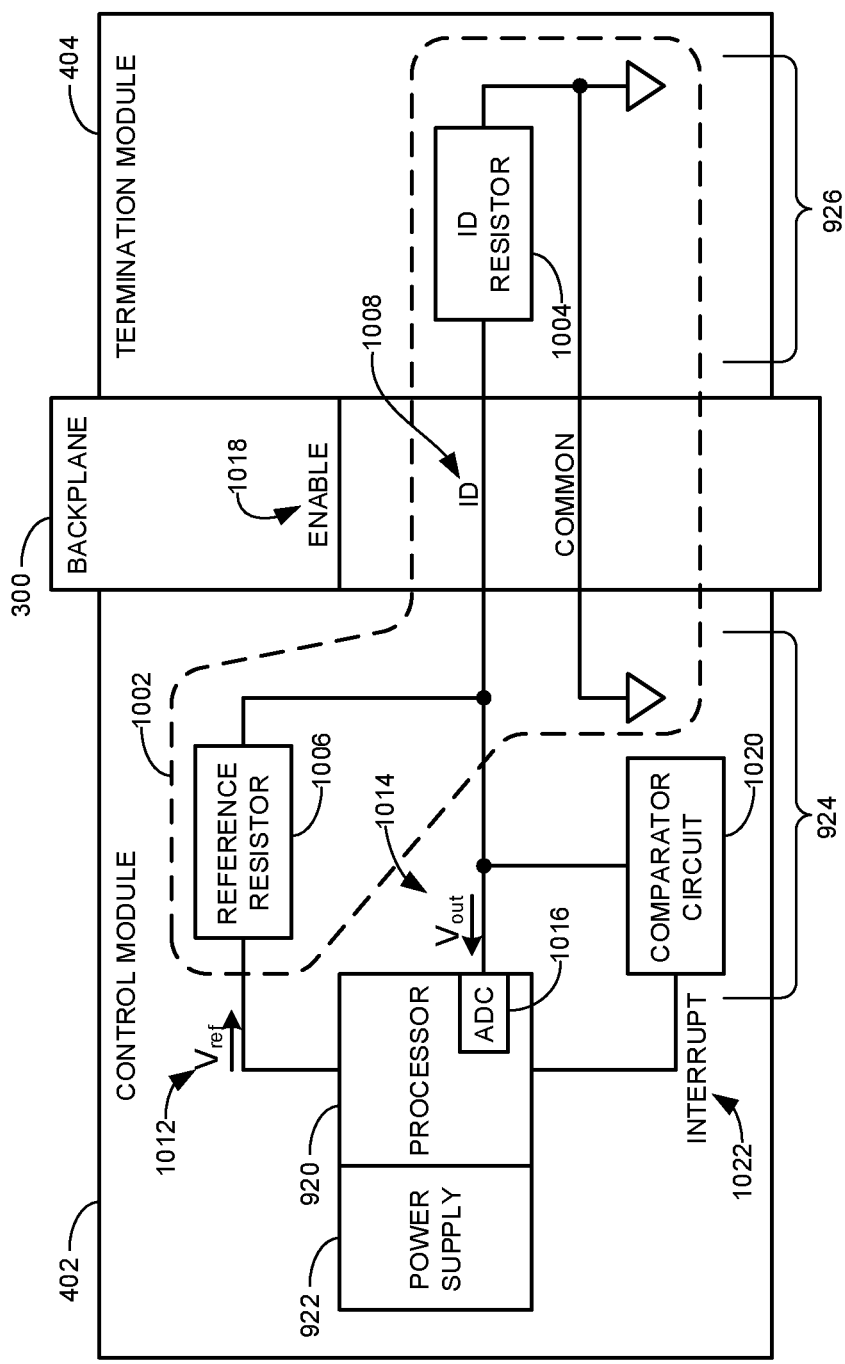
FIG. 10 is a block diagram illustrating an example implementation of the electronic keying functionality of the example control module and the example termination module of FIG. 9.

An example control module 402 communicatively coupled with a termination module 404 via the backplane 300 to illustrate the mechanism for implementing the electronic keying of the termination module 404 is shown in FIG. 10. As shown in the illustrated example, the termination module detector 924 (in the control module 402) and the module type indicator 926 (in the termination module 404) each include a resistor that together form a resistive voltage divider 1002 when the control module 402 and the termination module 404 are communicatively coupled via the backplane 300. More particularly, the termination module 404 includes an identification resistor 1004 that corresponds to the low half of the voltage divider (e.g., nearest the ground) while the control module 402 includes a reference resistor 1006 that corresponds to the high half of the voltage divider. In the illustrated example, the control module 402 includes the processor 920 (and associated power supply 922) that provides an input or reference voltage 1012 to the voltage divider 1002 at the reference resistor 1006. In the illustrated example, the voltage divider 1002 generates an output voltage 1014 that is provided to an analog to digital converter (ADC) 1016 implemented on the processor 920. In some examples, the termination module 404 provides an identification signal 1008 corresponding to the output voltage 1014 to uniquely identify the type of the termination module 404. More particularly, in some examples, the identification resistor 1004 in each different type of termination module 404 has a different resistance value than all other types of termination modules 404. As a result, the particular value of the output voltage will vary from one type of termination module 404 to another based on the differences in the identification resistors 1004 such that the processor 920 can uniquely identify each type of termination module.

More particularly, in some examples, the ADC 1016 converts the analog output voltage 1014 to a 16 bit digital value, which corresponds to 65,536 possible digital values. To allow for some variation in the output voltage 1014 (e.g., based on temperature effects and/or tolerances of the resistance values of the resistors 1004, 1006), in some examples, each different type of termination module 404 is scaled to the middle of a range of 512 digital values, thus, providing for up to 128 (65,536/512) different termination modules 404 that can be uniquely identified. In some examples, the 128 possible ranges for the output voltage are reduced based on several design considerations. For instance, in some examples, the top 48 of the 128 possible voltage ranges may be reserved for when no termination module 404 is installed (i.e., the voltage divider 1002 is not formed) while the bottom 20 of the 128 possible voltage ranges are excluded based on practical constraints in the voltage divider. With these limitations, it is still possible to uniquely identify up to 80 different types of termination modules 404.

In the illustrated example, the processor 920 may have access to a database of the different types of termination modules 404 and the expected 16 bit value resulting from the output voltage 1014 of the voltage divider to lookup the type of the termination module 404. Furthermore, in some examples, the database may also be used to determine whether a particular termination module 404 that has been identified is compatible with the control module 402. Once the processor 920 verifies that a termination module 404 is compatible with the control module 402, the processor 920 may generate an enable signal 1018 that enables communications associated with the I/O blocks 912 (in the control module 402) through the signal conditioners 918 (in the termination module 404) as shown in FIG. 9 and described in greater detail below. In this manner, if the termination module 404 is not compatible (or otherwise not recognized), the potentially unsafe situation of inadvertently mixing invalid terminations with a control module 402 is prevented.

In addition to identifying the type of termination module 404 to determine compatibility, in some examples, the arrangement of the voltage divider 1002 shown in FIG. 10 enables the control module 402 to detect when a termination module 404 is inserted to the termination slot and/or removed from the termination slot. For example, when a termination module 404 is removed, the low half of the voltage divider 1002 is also removed resulting in an open circuit that causes the output voltage 1014 to rise to the reference voltage 1012. In some examples, a comparator circuit 1020 detects this rise in the output voltage 1014 and generates an interrupt signal 1022 that is provided to the processor 920. In response to the interrupt signal 1022, the processor 920 may disable communications to the termination module 404 (e.g., terminate the enable signal 1018). Further, in some examples, the processor 920 may transmit a separate interrupt signal to a master CPU module 116 on the rack 200 to prevent I/O scanning until a termination module 404 is reinserted into the corresponding slot.

In this same manner, when the termination module 404 is inserted into a termination slot on the backplane 300 communicatively coupled to a control slot where the control module 402 is installed, the comparator circuit 1020 detects a drop in the output voltage 1014 (relative to the reference voltage 1012) and generates another interrupt signal 1022. In some examples, the interrupt signal 1022, indicative of the insertion of a termination module 404, triggers a validation process for the termination module 404 in which the processor 920 identifies and verifies the compatibility of the termination module 404 as described above. Thus, in some examples, the interrupt signal 1022 after removal of the termination module 404 is distinguishable from the interrupt signal 1022 after insertion of the termination module 404.

Figure 11:
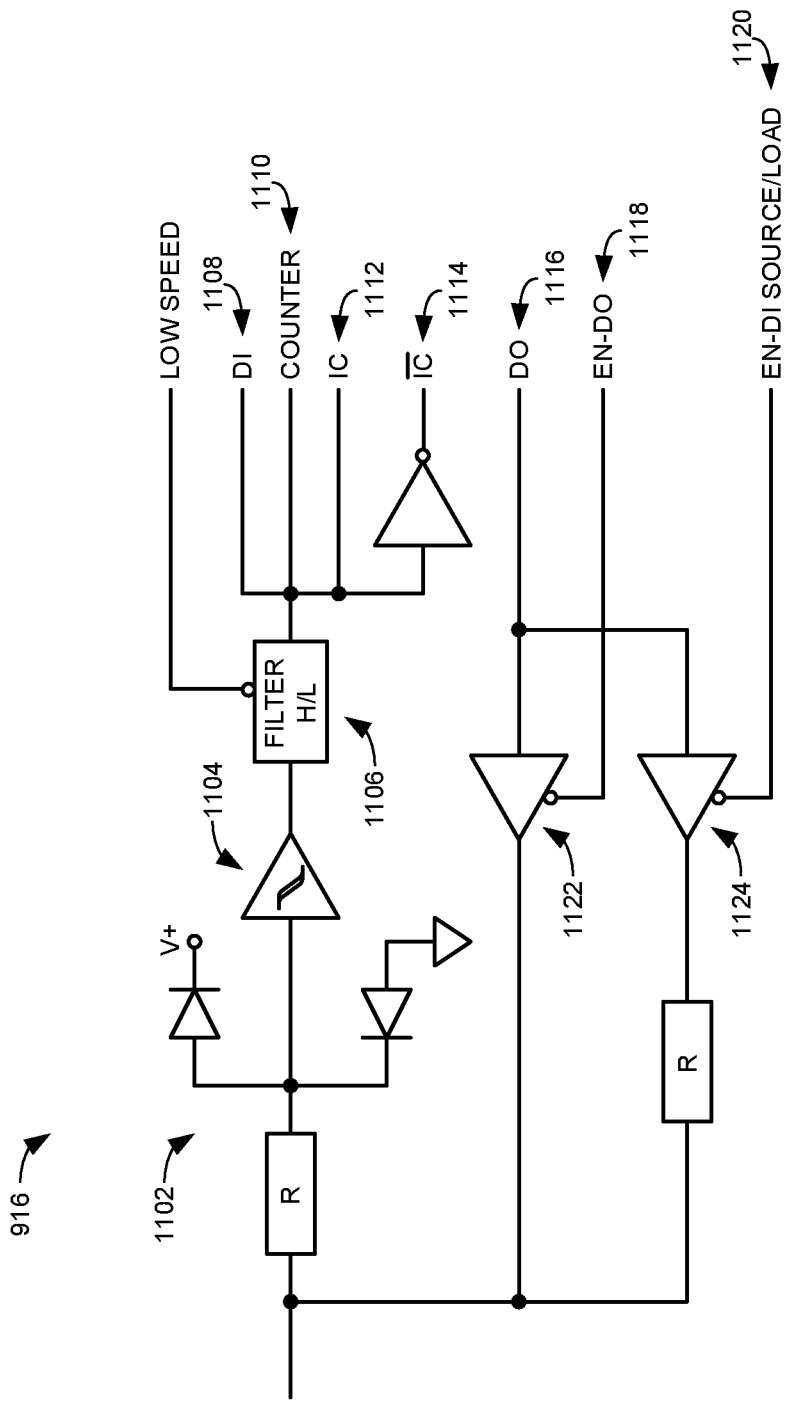
FIG. 11 is a schematic of example circuitry for one of the example discrete I/O blocks of the control module of FIG. 9.

FIG. 11 is a schematic of example circuitry for a discrete I/O block 916 shown in FIG. 9 corresponding to a discrete I/O point of an example I/O module 118. In some examples, each discrete I/O point is capable of being configured as a status input, a pulse input, a discrete output, or a pulse output. The example discrete block 916 includes example input over-voltage protection 1102 to protect against over-voltage corresponding to the difference in input voltage from a transorb clamp voltage to the circuitry power rails (e.g., ground). As shown in FIG. 11, the input over-voltage protection 1102 includes current limiting impedance and clamping diodes to the power supply rails.

In some examples, the discrete block 916 includes an input level dead-band 1104 to prevent the transition from high to low and low to high from occurring at the same input voltage level. Further, in the illustrated example, the discrete block 916 includes a filter block 1106 that is flexible enough to handle relatively low frequency inputs for status and slow pulse counting and up to 15 kHz pulse counting. In some examples, the filter block 1106 is selectable between the low frequency status inputs and other high frequency inputs. In other examples, a separate filter is provided for the status input.

In the illustrated example, the discrete block 916 generates multiple output signals to a processor (e.g., the processor 920 of FIG. 9) that drives the discrete input functionality of the block 916. As shown in the illustrated example, the discrete block 916 outputs include a discrete input (DI) status signal 1108, a counter signal 1110, an input capture signal 1112, and an inverted input capture signal 1114. In some examples, the DI status signal 1108 and the counter signal 1110 are on the same processor pin if the functionality can be separated and read individually. In the illustrated example, the DI status signal 1108 provides an indication of state based on a reading of either "1" or "0". In some examples, the counter 1110 is a high speed counter provided on the processor (e.g., a K61 series CPU) of the I/O module 118. In some examples, the input capture signal 1112 is connected to one of the timer inputs on the I/O module processor and serves to measure the logical high period of a pulse. Similarly, the input capture signal 1114 may be connected to one of the timer inputs on the I/O module processor and serves to measure the logical low period of a pulse.

In the illustrated example, the discrete block 916 provides for multiple processor outputs including a discrete output (DO) status signal 1116, an enable DO signal 1118, an enable DI source/load signal 1120. In the illustrated example, the DO status signal 1116 provides an indication of state based on a reading of either "1" or "0". In the illustrated example, a pulse output signal is provided via the DO status signal 1116. In other examples, a pulse output signal may be connected to one of the processor timers to provide a pulse-width modulated output. In the illustrated example, the enable DO signal 1118 enables the discrete output signal. In some examples, when the discrete output signal is disabled, the signal going off the board is high impedance. In some examples, when the enable DI source/load signal 1120 is enabled and the DO Status is high (e.g., "1"), a contact wetting voltage, through a current limiting resister, will be present on the input. By contrast, when the enable DI source/load signal 1120 is enabled and the DO status is low (e.g., "0"), the current limiting resistor will be connected to circuit common providing a lower impedance for the discrete input.

In some examples, the discrete block 916 includes a DO output driver 1122 and a DI source/load driver 1124. In the illustrated example, when the discrete block 916 is configured for output functionality, the DO output driver 1122 is enabled to provide the output based on the state of the DO Status signal 1116. In the illustrated example, when the discrete block 916 is configured for input functionality and a contact wetting (or open collector) input is configured, the DI source/load driver 1124 is enabled with a DO status signal 1116 of "1". By contrast, if the contact wetting is not enabled, the DI source/load driver 1124 is enabled with a DO status signal 1116 of "0".

In the illustrated example, the discrete block 916 is in an inactive state or PTS (protect thyself) mode where no field outputs are active when the enable DO signal 1118 and the enable DI source/load signal 1120 are disabled. Thus, the discrete block 916 is in an input only mode with no sourcing voltages when in the inactive state. In some examples, the discrete block 916 is in an active state when in the output mode to allow for feedback on outputs that may be used for error detection. In some examples, the inactive state is the default state for the discrete block 916 on power up. Further, in some examples, the inactive state is entered when the I/O module 118 determines that no termination module 404 is installed in the corresponding termination slot, that the termination module 404 has been removed, or that an installed termination module 404 is invalid (e.g., not compatible with the I/O module 118). In some examples, these determinations are made using the electronic keying methodology described above.

Figure 12:
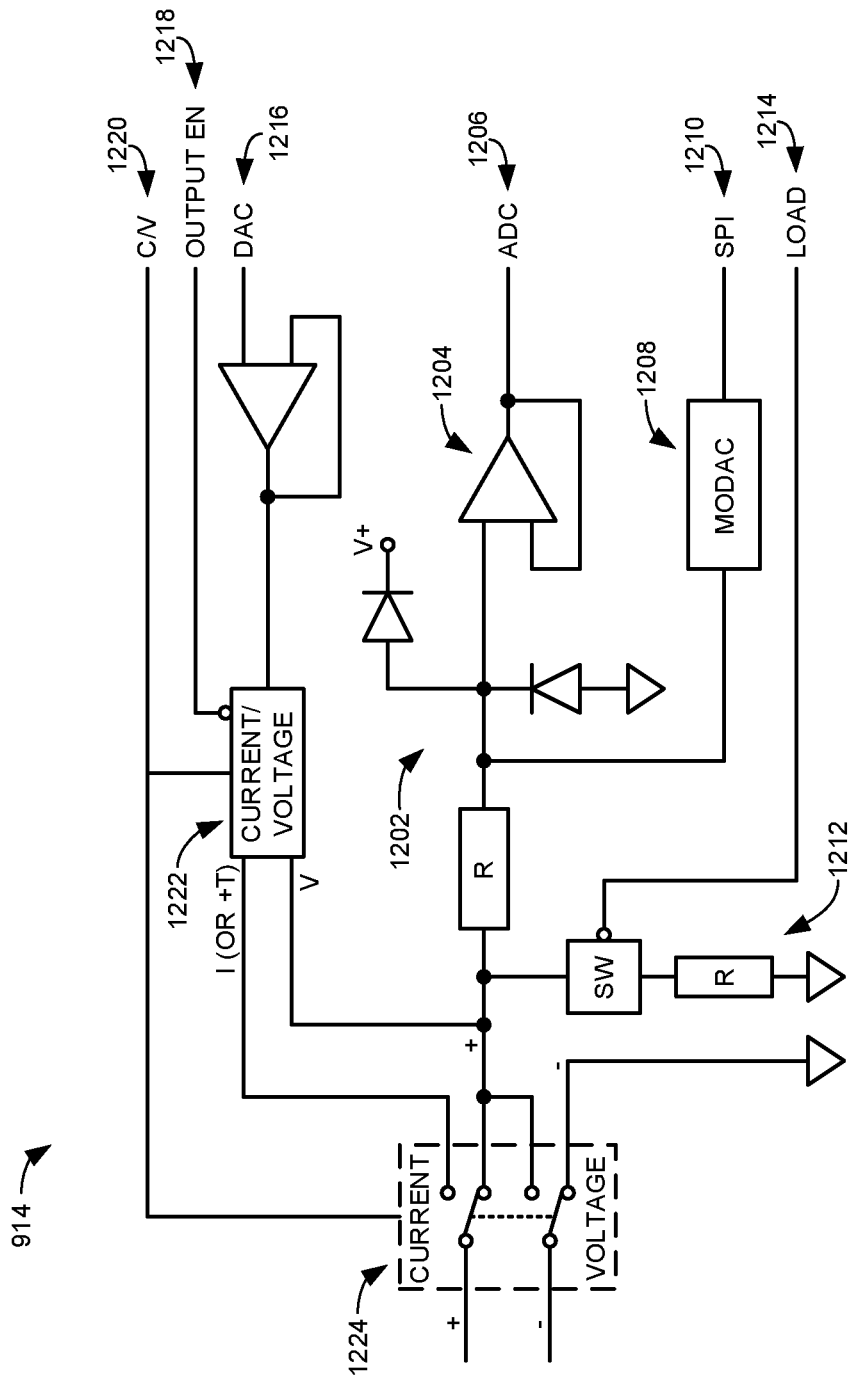
FIG. 12 is a schematic of example circuitry for one of the example analog I/O blocks of the control module of FIG. 9.

FIG. 12 is a schematic of example circuitry for an analog I/O block 914 shown in FIG. 9 corresponding to an analog I/O point of an example I/O module 118. In some examples, each analog I/O point is capable of being configured as a voltage input (e.g., 0 to 5V), a current input (e.g., 4 to 20 mA), a voltage output (e.g., 0 to 5V), or a current output (e.g., 4 to 20 mA). In some examples, the current inputs and outputs are HART capable. Additionally or alternatively, the HART protocol may be implemented if the impedance requirements are met externally. The example analog block 914 includes example input over-voltage protection 1202 to protect against over-voltage corresponding to the difference in input voltage from a transorb clamp voltage to the circuitry power rails (e.g., ground). As shown in FIG. 12, the input over-voltage protection 1202 includes current limiting impedance and clamping diodes to the power supply rails.

In some examples, the analog block 914 includes an input buffer amplifier 1204 to implement voltage scaling and impedance matching for the voltage input. In some examples the input buffer amplifier 1204 functions as a selectable gain amplifier in situations where a 0 to 1V voltage range is contemplated. Further, in the illustrated example, the analog block 914 includes an analog to digital converter (ADC) 1206. In some examples, the ADC 1206 is external to the processor of the I/O module 118 to allow for adequate update rates and resolution. In particular, in some examples, each analog channel has at least 16 bit resolution (with a 0.01% accuracy). Further, in some examples, all analog blocks 914 on an I/O module 118 (e.g., all analog channels) are sampled at least once every 10 milliseconds. In some such examples, a multiplexer may be used so long as the sample rates per block are achieved.

In some examples, the analog block 914 includes an integrated circuit 1208 to detect the imposed frequency on the 4-20 mA signal, convert the signal to a digital form, and present the digital signal in the HART protocol format. For an output, the integrated circuit 1208 takes digital HART signals from the I/O module 118 processor and converts the signals to frequency modulated signals and imposes them on the 4-20 mA output. In some examples, the integrated circuit 1208 interfaces with the processor of the I/O module 118 via a serial peripheral interface (SPI) bus 1210. Further, in the illustrated example, the analog block 914 includes a current load resistor 1212 that is enabled by a load signal 1214 from the processor of the I/O module 118 when the analog block 914 is in a current mode. In some examples, the current load resistor 1212 serves to convert current to voltage for input to the ADC 1206 and to provide feedback for a current/voltage output driver 1222. In the illustrated example, the load signal 1214 is independent from the current/voltage selection (via an output pin selector 1224) because the analog input may be used in a voltage mode with an external loop supply and current resistor.

In the illustrated example, the analog block 914 receives multiple processor outputs that drive the functionality of the block 914. As shown in the illustrated example, the processor outputs include a signal from a digital to analog converter (DAC) 1216, an output enable signal 1218, and a current/voltage selection signal 1220. In some examples, the DAC signal 1216 is used when the analog block 914 is in an output mode. Further, in some examples, the DAC signal 1216 is used to drive the +T supply when the analog block 914 is in a current mode. In some examples, the DAC signal 1216 is external to the processor of the I/O module 118 with a resolution of at least 15 bits. In some examples, the DAC signal 1216 may use the integrated circuit 1208 if the integrated circuit 1208 supports this function. In the illustrated example, the output enable signal 1218 enables the current/voltage output driver 1222. In the illustrated example, when the output enable signal 1218 is disabled, the output lines present a high impedance. In some examples, the current/voltage selection signal 1220 selects or specifies whether the current/voltage output driver 1222 and the output pin selector 1224 is in the current mode or the voltage mode.

In some examples, the analog block 914 includes an output buffer amplifier 1226 to implement voltage scaling and impedance matching from the DAC signal 1216. In some examples, the functionality of the output buffer amplifier 1226 may include a feedback loop from the current load resistor 1212 and/or the analog voltage input stage.

In the illustrated example of FIG. 12, the analog block 914 includes the current/voltage output driver 1222. The mode of the output driver (either current or voltage) when enabled, is based on the current/voltage selection signal 1220. In some examples, when the analog block 914 is in a voltage mode, the output of the output buffer amplifier 1226 is passed to the output driver 1222 through protection circuitry. In some examples, when the analog block 914 is in a current mode, the output driver 1222 controls the output current (e.g., from a 24V source on the I/O module 118) in relationship to the voltage provided from the DAC signal 1216 through the output buffer amplifier 1226. In some such examples, the output driver 1222 may be implemented for either analog inputs or analog outputs. Further, in some examples, when the analog block 914 is in input mode, the output driver 1222 provides a +T loop power. In some such examples, the DAC signal 1216 and associated circuitry provide scaling of the current to at least 22 mA. In some examples, the current is scaled to at least 25 mA.

In the illustrated example, the functionality of the analog block 914 depends on (1) whether the analog block 914 is in either a current mode or a voltage mode and (2) whether the analog block 914 is in either an input mode or an output mode. Accordingly, the analog block 914 is provided with the output pin selector 1224 to enable the firmware to provide the proper alignment. As noted above, each I/O module 118 may be coupled with different types of termination modules 404, which may affect (e.g., prevent) the use of certain combinations of the current/voltage and the input/output modes. The example output pin selector 1224 shown in the illustrated example of FIG. 12 is representative of the mechanism used to implement the output pin selector 1224 but other implementations are possible. For example, the output pin selector 1224 may be implemented via a solid state solution. In other examples, the output pin selector 1224 may be implemented via a miniature double-pole, double-throw (DPDT) latching relay, in which a separate signal for the current and voltage would be provided to manage two coils.

In the illustrated example, the analog block 914 is in an inactive state or PTS (protect thyself) mode where no field outputs are active when the output enable signal 1218 is off, the load resistor enable signal is off, and when the analog block 914 is set to the voltage mode. Thus, the analog block 914 is in an input only mode with no sourcing voltages when in the inactive state. In some examples, the analog block 914 is in an active state when in the output mode, which allows for feedback on outputs that may be used for error detection.

In some examples, the inactive state is the default state for the analog block 914 on power up. Further, in some examples, the inactive state is entered when the I/O module 118 determines that no termination module 404 is installed in the corresponding termination slot, that the termination module 404 has been removed, or that an installed termination module 404 is invalid (e.g., not compatible with the I/O module 118). In some examples, these determinations are made using the electronic keying methodology described above.

Figure 13:
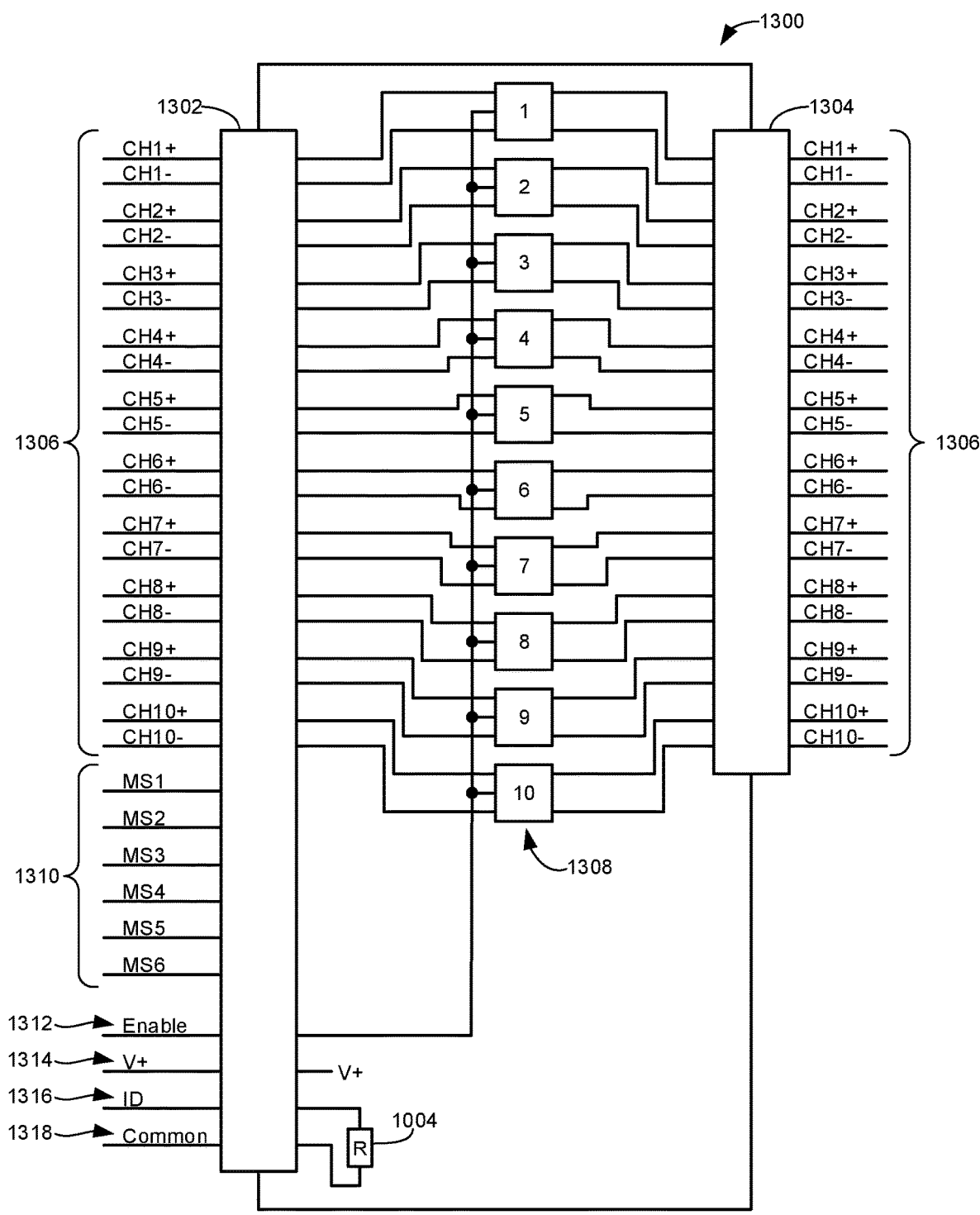
FIG. 13 illustrates an example implementation of the termination module of FIG. 9 as a ten-channel termination module.

FIG. 13 illustrates an example ten-channel termination module 1300 corresponding to one of the termination modules 404 of FIG. 4. In some examples, the termination module 1300 may be adapted to operate with the analog I/O module 118 of FIG. 6, the mixed analog/discrete I/O module 118 of FIG. 8, or another type of ten-channel I/O module 118. In the illustrated example of FIG. 13, the termination module 1300 includes a backplane connector 1302 that communicatively couples the termination module 1300 to the backplane 300 of the rack 200 as described above. Further, the example termination module 1300 of FIG. 13 includes a termination block 1304 that enables wires from field devices and/or other components to be coupled to the termination module 1300. In some examples, the termination block 1304 corresponds to the separable terminal block 416 communicatively coupled to the module connectors 424 of the signal conditioning card 418 discussed above in connection with FIG. 4.

As shown in the illustrated example of FIG. 13, the termination module 1300 provides for twenty signals corresponding to ten channels 1306 of two terminals each (for both a positive and negative signal). In the illustrated example, signals transmitted over each of the ten channels 1306 pass between the termination block 1304 and the backplane connector 1302 through a conditioning circuit 1308 specific to each channel 1306. Different termination modules with different types of conditioning circuitry implemented within the conditioning circuits 1308 correspond to different types of the termination module 1300 that may be identified based on the resistance value of the identification resistor 1004 as described above. Some types of termination modules 1300 may include the same circuitry for each one of the conditioning circuits 1308. Other types of termination modules 1300 may include different types of circuitry in different ones of the conditioning circuits 1308 corresponding to different channels on the termination module 404. The conditioning circuits 1308 are described in greater detail below in connection with FIGS. 16-22.

In addition to the ten channels 1306, in some examples, the termination module 1300 provides for six additional signals 1310 that may provide module specific functionality. In the illustrated example of FIG. 13, the module specific signals 1310 are not used. Further, in the illustrated example, the backplane connector 1302 of the termination module 1300 includes a connector to receive an enable signal 1312. In the illustrated example, the enable signal 1312 corresponds to the enable signal 1018 (described in connection with FIG. 10) generated by a control module 402 after the termination module 1300 is confirmed to be compatible with the control module. In some examples, the enable signal 1312 is used to enable conditioning circuits 1308. As shown in the illustrated example, the backplane connector 1302 includes a connector for a voltage input 1314 to provide voltage to the non-isolated circuitry of the termination module 1300. Additionally, as shown in FIG. 13, the example termination module 1300 includes connectors for an identification signal 1316 and a common signal path 1318 communicatively coupled in series with the identification resistor 1004 that forms the low half of the voltage divider 1002 to uniquely identify the termination module 1300 as described above in connection with FIG. 10. That is, in the illustrated example, the identification signal 1316 corresponds to the identification signal 1008 discussed above in connection with FIG. 10.

Figure 14:
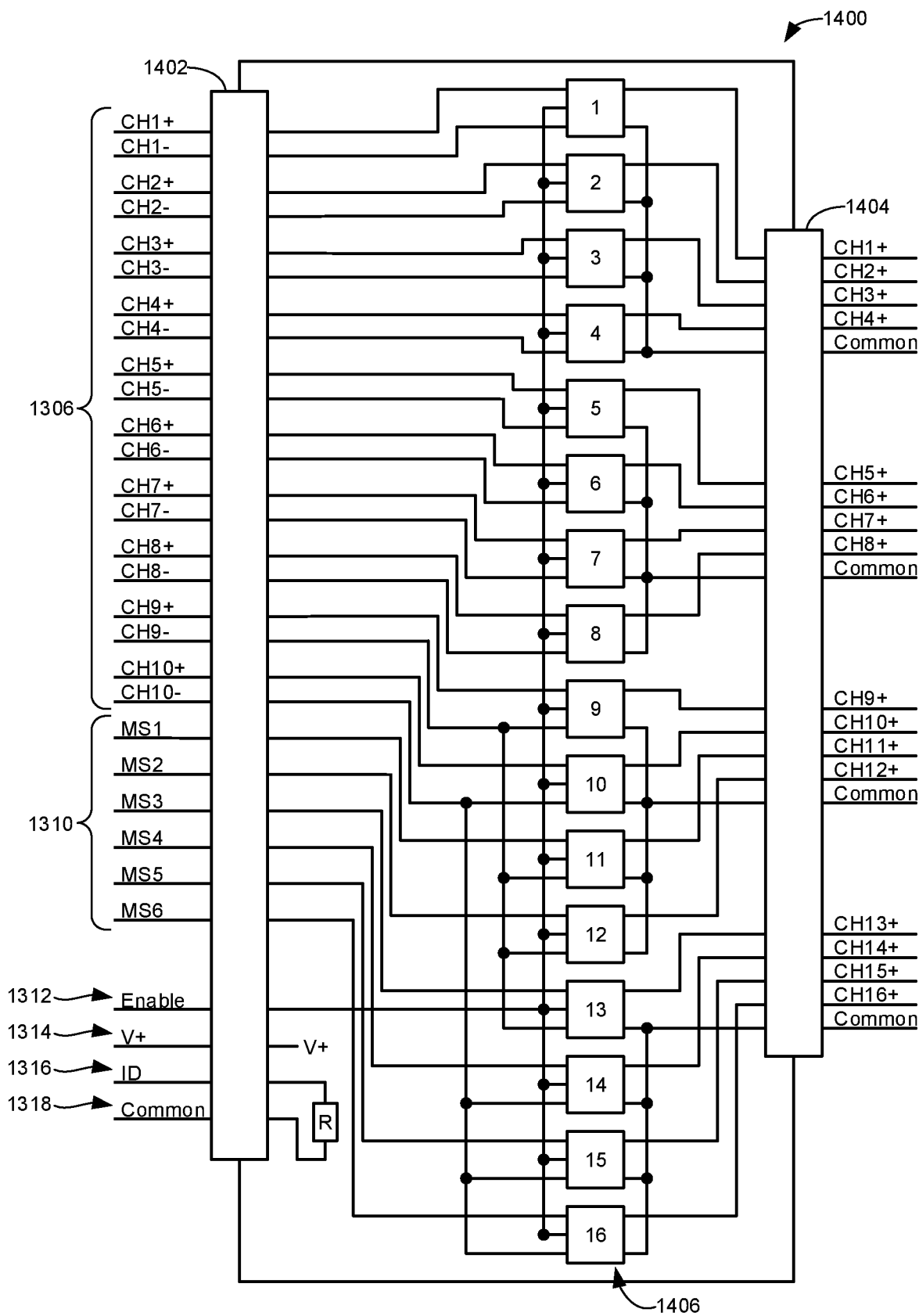
FIG. 14 illustrates an example implementation of one of the termination modules of FIG. 4 as a sixteen-channel termination module.

FIG. 14 illustrates an example sixteen-channel termination module 1400 corresponding to one of the termination modules 404 of FIG. 4. In some examples, the termination module 1400 may be adapted to operate with the high density discrete I/O module 118 of FIG. 7. In the illustrated example of FIG. 14, the termination module 1400 includes a backplane connector 1402 that communicatively couples the termination module 1400 to the backplane 300 of the rack 200 as described above. Further, the example termination module 1400 of FIG. 14 includes a termination block 1404 that enables wires from field devices and/or other components to be coupled to the termination module 1400. In some examples, the termination block 1404 corresponds to the separable terminal block 416 communicatively coupled to the module connectors 424 of the signal conditioning card 418 discussed above in connection with FIG. 4.

In some examples, the backplane connector 1402 of the sixteen-channel termination module 1400 of FIG. 14 is configured similarly to the backplane connector 1302 of the ten-channel termination module 1300 of FIG. 13. That is, both of the backplane connectors 1302, 1402 shown in FIGS. 13 and 14 include positive and negative signal paths for ten channels 1306, connectors for the six module specific signals 1310, and connectors for the enable signal 1312, the voltage input 1314, the identification signal 1316, and the common signal path 1318. In some examples, the backplane connectors 1302, 1402 of the different termination modules 1300, 1400 shown in FIGS. 13 and 14 are similarly configured so that a single design for the termination slots 211-218 in the rack 200 can receive either one of the termination modules 1300, 1400 (and/or other types of similarly configured termination modules).

While the backplane connectors 1302, 1402 of the different termination modules 1300, 1400 (and the associated signals) are similar, the internal circuitry and corresponding signal paths between the backplane connector 1402 and the terminal block 1404 of FIG. 14 are different than as shown in FIG. 13. For example, sixteen-channel termination modules constructed in accordance with the teachings disclosed herein are for high density discrete inputs or a high density mix of discrete inputs and discrete outputs. More particularly, in the example termination module 1400 of FIG. 14, the first eight of the ten channels 1306 are configured to interface with discrete blocks (e.g., the discrete blocks 916 of FIG. 9) that can support discrete inputs, pulse inputs, and/or discrete outputs, while the remaining two of the ten channels 1306 as well as the module specific signals 1310 are used for discrete inputs. In other examples, the number of generic discrete blocks relative to exclusively discrete inputs may differ from what is shown in the illustrated example.

As shown in the illustrated example, signals transmitted over each of the ten channels 1306 pass between the termination block 1404 and the backplane connector 1402 through a conditioning circuit 1406 specific to each channel 1306. Further, the module specific signals pass through other conditioning circuits 1406 corresponding to each signal. In the illustrated example, the conditioning circuits 1406 (numbered 11-16) associated with the module specific signals 1310 are paired with the negative signal associated with one of channels 9 or 10. In particular, the first three module specific signals (MS1-MS3) are paired with the negative signal path for channel 9 while the second three module specific signals (MS4-MS6) are paired with the negative signal path for channel 10. As shown in the illustrated example, the sixteen channels of the termination module 1400 share common terminations at the terminal block 1404 with one common termination for every four channels.

Figure 15:
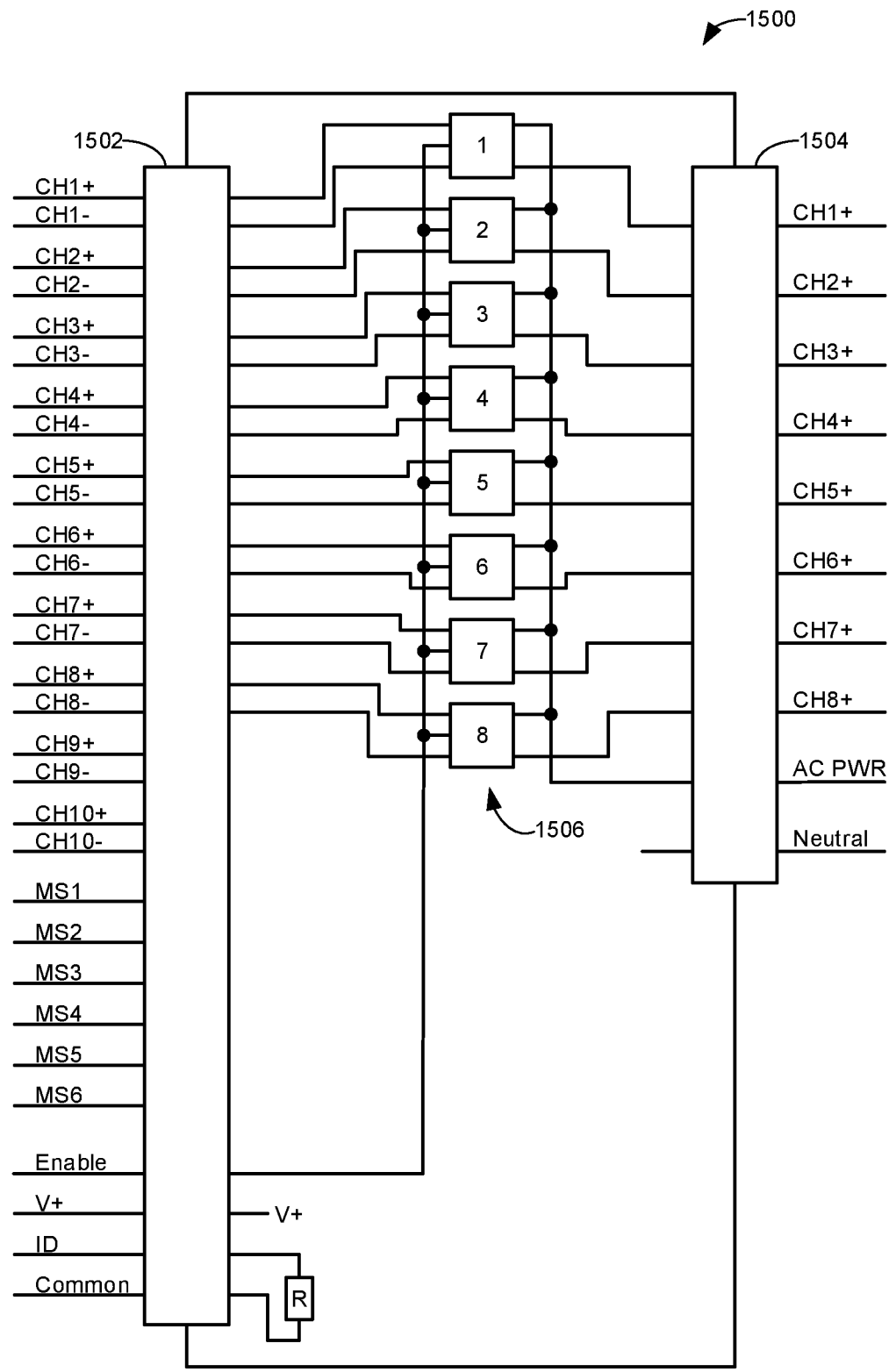
FIG. 15 illustrates an example implementation of one of the termination modules of FIG. 4 as an eight-channel AC termination module.

FIG. 15 illustrates an example eight-channel AC termination module 1500 corresponding to one of the termination modules 404 of FIG. 4. In some examples, the termination module 1500 may be used for alternating current (AC) inputs and outputs. As with the termination modules 1300, 1400 of FIGS. 13 and 14, the example eight-channel AC termination module 1500 of FIG. 15 includes a backplane connector 1502 that may be configured similarly to the backplane connectors 1302, 1402 of FIGS. 13 and 14. Further, the example eight-channel AC termination module 1500 of FIG. 15 includes a termination block 1504. In some examples, the termination block 1504 corresponds to the separable terminal block 416 communicatively coupled to the module connectors 424 of the signal conditioning card 418 discussed above in connection with FIG. 4. In some examples, terminal spacing requirements result in every other termination point on the termination block 1504 being used, resulting in ten terminals for field wiring. As shown in the illustrated example, the ten terminals correspond to the eight channels provided for by the termination module 1500, an AC power terminal, and a neutral terminal. Further still, as with the termination modules 1300, 1400 of FIGS. 13 and 14, the example eight-channel AC termination module 1500 of FIG. 15 includes conditioning circuits 1506 for each of the channels.

While example implementations of the termination modules 1300, 1400, 1500 are shown in the illustrated examples of FIGS. 13-14, different types of termination modules (e.g., with a different number of available channels used for the same or different purposes) may alternatively be implemented in accordance with the teachings disclosed herein.

FIGS. 16-22 illustrate different example types of circuitry to implement the conditioning circuits 1308, 1406, 1506 of FIGS. 13-15. As mentioned above, the termination module 404 provides specific circuitry to characterize and/or condition the signals transmitted via each channel of the termination module 404. In this manner, the control modules 402 may be implemented for multiple different purposes depending on the particular type of termination module 404 (e.g., based on the type(s) of conditioning circuits 1308, 1406, 1506) with which each control module 402 is paired (via the backplane 300 of the rack 200). Furthermore, separating out certain functionality and/or circuitry from a control module 402 into a separate termination module 404 can protect the rest of the electronics of the control module 402 if the circuitry within the termination module fails. Further still, this approach reduces the cost of replacement to an end user because only the termination module needs to be replaced while the relatively more expensive control module 402 can still be used.

Figure 16:
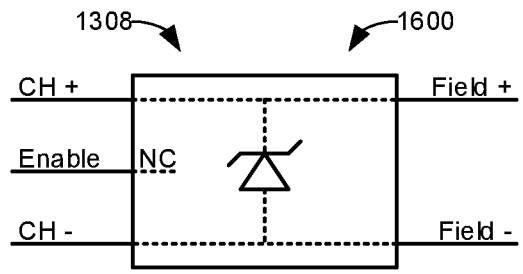
FIGS. 16-22 illustrate different example types of circuitry to implement the example conditioning circuits of FIGS. 13-15.

Turning in detail to the figures, FIG. 16 illustrates an example surge protection circuit 1600 that may correspond to different ones of the conditioning circuits 1308, 1406, 1506 of FIGS. 13-15. The example surge protection circuit 1600 provides overvoltage or surge protection such that no overvoltage condition can reach the backplane 300 (or the control module 402). Typical voltages may be between 12 and 24 volts but may surge (e.g., from incorrect wiring, lightning induced, etc.) up to 5,000 volts. In some examples, the surge protection circuit limits the voltage to the backplane 300 and/or control module 402 to 30 volts or less and may also provide additional current limiting.

Figure 17:
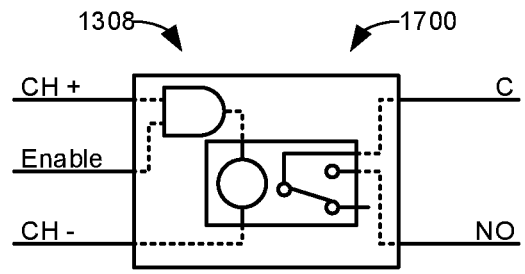
Figure 18:
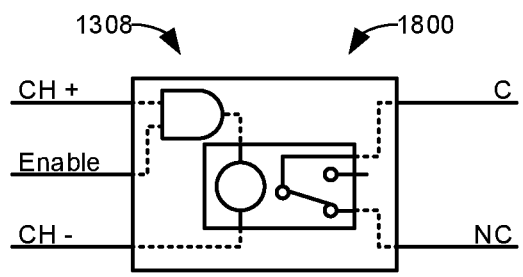

FIG. 17 illustrates an example normally open relay 1700 and FIG. 18 illustrates an example normally closed relay 1800 that may correspond to different ones of the conditioning circuits 1308, 1406, 1506 of FIGS. 13-15. The example relays 1700, 1800 are used with discrete outputs and provide isolation. In the illustrated examples, the relays 1700, 1800 also provide a known state when power to the circuits is removed.

Figure 19:
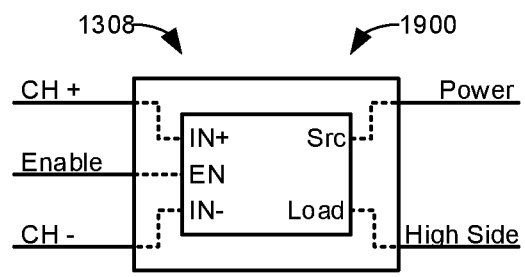
Figure 20:
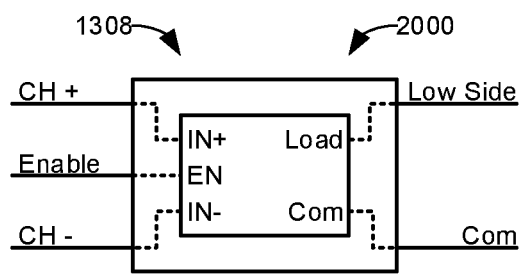

FIG. 19 illustrates an example high side driver 1900 (sometimes referred to as a solid state relay) and FIG. 20 illustrates an example low side driver 2000 that may correspond to different ones of the conditioning circuits 1308, 1406, 1506 of FIGS. 13-15. In some examples, the high side driver 1900 is optically isolated. In some examples, the high and low side drivers 1900, 2000 are used for discrete outputs or slow pulse outputs when fast switching is required at relatively large currents. The example high side driver 1900 switches power on the high or positive side of the load while the example low side driver 2000 switches power on the low or negative side of the load.

Figure 21:
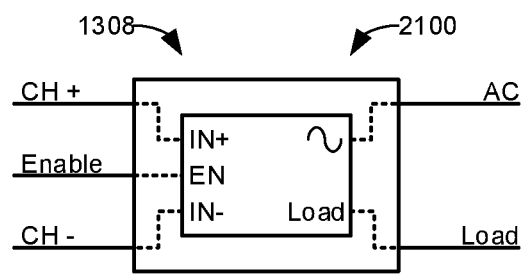
Figure 22:
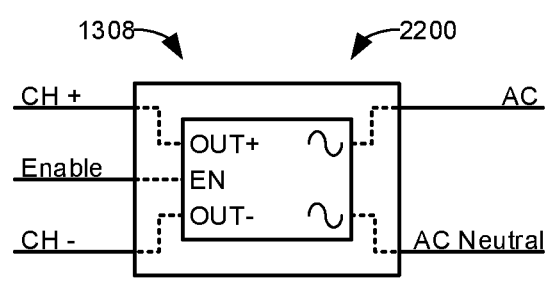

FIG. 21 illustrates an example AC input circuit 2100 and FIG. 22 illustrates an example AC output circuit 2200 that may correspond to different ones of the conditioning circuits 1308, 1406, 1506 of FIGS. 13-15. In some examples, the AC circuits may be implemented as solid state AC input and output drivers that are optically isolated. In some examples, the AC circuits may be used in control applications (e.g., presets). In some examples, the AC input circuit 2100 is used with discrete inputs to detect the presence (or lack) of an AC voltage on the field terminations. In some examples, the AC output circuit 2200 is used with discrete inputs to switch an AC voltage to a load.

Additional example conditioning circuits 1308, 1406, 1506 include a high voltage (e.g., greater than 30 VDC) input circuit that uses a high voltage input translator for discrete inputs or slow pulse inputs, a millivolt to volt amplifier that may be used for analog inputs, a pulse amplifier to amplify low level pulse signals from direct pickup devices, a differential amplifier to allow analog inputs into a standard analog I/O module by providing a front end for high common mode signals, a fuse (e.g., either one-time or resettable) for high current outputs, a permissive input that prevents any output communications unless activated, or a redundancy block in a redundant signal conditioning card (described below in connection with FIG. 23) to route field inputs to two control modules configured in redundant mode and manage switchover of outputs based on the active control module. Other example conditioning circuits may include an environment sensors that measure and/or detect ambient temperature, humidity, pressure, and/or gas in a self-contained matter (e.g., without wiring to external devices). Some conditioning circuits may provide motor control functionality such as, for example, drivers for an AC induction motor, a DC motor, or a stepper motor. Further, the example conditioning circuits may provide position detection functionality including, for example, a resolver, a linear encoder, a rotary encoder, and/or sensor interfaces to detect tilt, pitch, and/or angle. In some examples, the conditioning circuits provide an interface with a strain gage and/or associated amplifiers. In some examples, the conditioning circuits provide an interface for a multi-axis accelerometer (e.g., to monitor and/or detect vibration). Additionally or alternatively, in some examples, the conditioning circuits provide a video/still camera interface that may enable position (e.g., up, down, left, right) and/or other forms of control (e.g., zoom). In some examples, the conditioning circuits provide audio detection functionality such as, for example, detecting deviations (bangs, absence of sound, etc.) from a baseline sound level to generate appropriate alarms and/or other relevant feedback.

Additionally or alternatively, other types of conditioning circuits may be implemented in termination modules 404 intended for use with corresponding CPU modules 116 or COM modules. For example, COM modules 120 have logic level signals (Tx, Rx, RTS) that may be converted by a communicatively coupled termination module 404 for specific types of communication such as: RS232, RS485, RS422. In some examples, the level shifting is done by conditioning circuits within the termination module 404.

Figure 23:
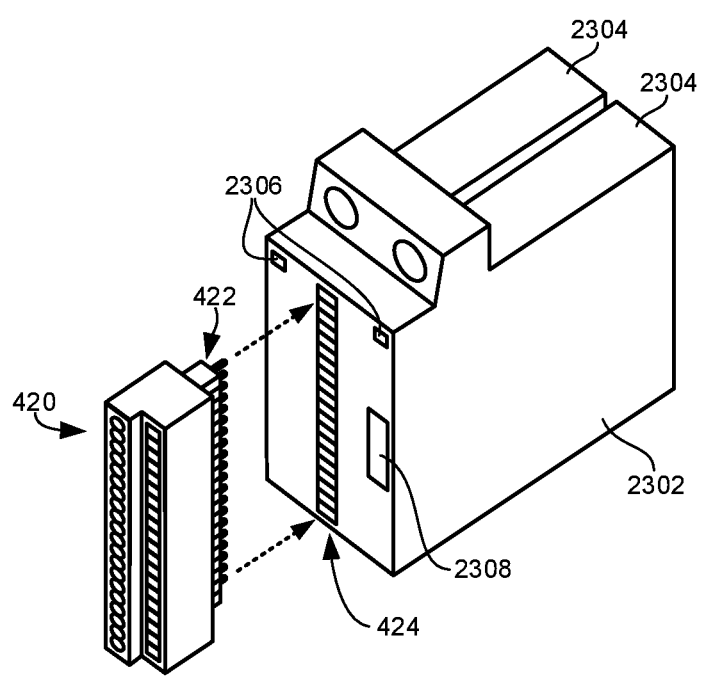
FIG. 23 illustrates two example signal conditioning cards of FIG. 4 that share a common terminal block.

As noted above, in some examples, two different control modules 402 may be used in a redundant mode with one serving as a backup to the other when the control modules 402 are placed in one of the redundant pairs 220, 222, 224, 226 of the control slots 201-208 of the rack 200. In some examples, to facilitate the coupling of field devices to both modules, the circuitry of two signal conditioning cards 418 of two of the same type of termination module 404 are combined to form a redundant signal conditioning card 2302 as illustrated in FIG. 23. As shown in the illustrated example, the redundant signal conditional card 2302 includes two backplane connector portions 2304 structured to fit within two adjacent termination slots of a rack 200 but only a single set of module connectors 424 that communicatively couple with corresponding module connectors 422 on a terminal block 416. In some examples, each of the backplane connector portions 2304 house similar circuitry to the individual signal conditional cards 418 described above.

Further, in some examples, the redundant signal conditioning card 2302 includes additional circuitry to split input signals from the field devices (communicatively coupled to the signal conditioning card 2302 via the terminal block 416) into two to provide the same signals to the circuitry in each of the backplane connector portions 2304. In this manner, the active control module of the redundant pair of modules receives the necessary signals to implement control while the backup control module receives the same signals to monitor the active module for errors and be ready to take over when a failure is detected. In some examples, the redundant signal conditioning card 2302 includes indicators 2306 (e.g., LEDs) to indicate which backplane connector portions 2304 is currently associated with an active control module 402. Further, in some examples, the redundant signal conditioning card 2302 includes switch 2308 to test and/or initiate a failover.

Additionally or alternatively, for output signals, the example redundant signal conditioning card 2302 may include a relay to switch between two redundant control modules 402 (communicatively coupled to the redundant card 2302) based on which control module 402 is in active mode. For example, if the control module in an odd numbered control slot (e.g., a default active slot) is active, the relay would be inactive (normally closed) to connect output signals from the primary control module 402 (active module in the odd numbered control slot) to the field terminations. By contrast, in some examples, if the control module in an even numbered control slot is active (e.g., the secondary module is active), the module would use the enable signal to activate the relay thereby connecting the output signals from the secondary control module to the field terminations. In some examples, the additional circuitry in the redundant signal conditioning card 2302 also enables bumpless transfer between the modules when there is a failover by providing loading and feedback on the non-active module so that the outputs on both control modules 402 are the same prior to switching.

In some examples, each different type of redundant signal conditioning card 2302 includes a unique identification resistor 1004 to distinguish the type of signal conditioning card from other signal conditioning cards whether they are redundant or not. Thus, in some examples, the processor in each of the two redundant control modules 402 communicatively coupled with a redundant signal conditioning card 2302 automatically detects the redundant signal conditioning card 2302. In some such examples, the processor in each of the redundant control modules automatically configures the control modules 402 to operate in redundant mode (e.g., automatically designates one control module as the primary module and the other module as the secondary or failover module).

Figure 24:
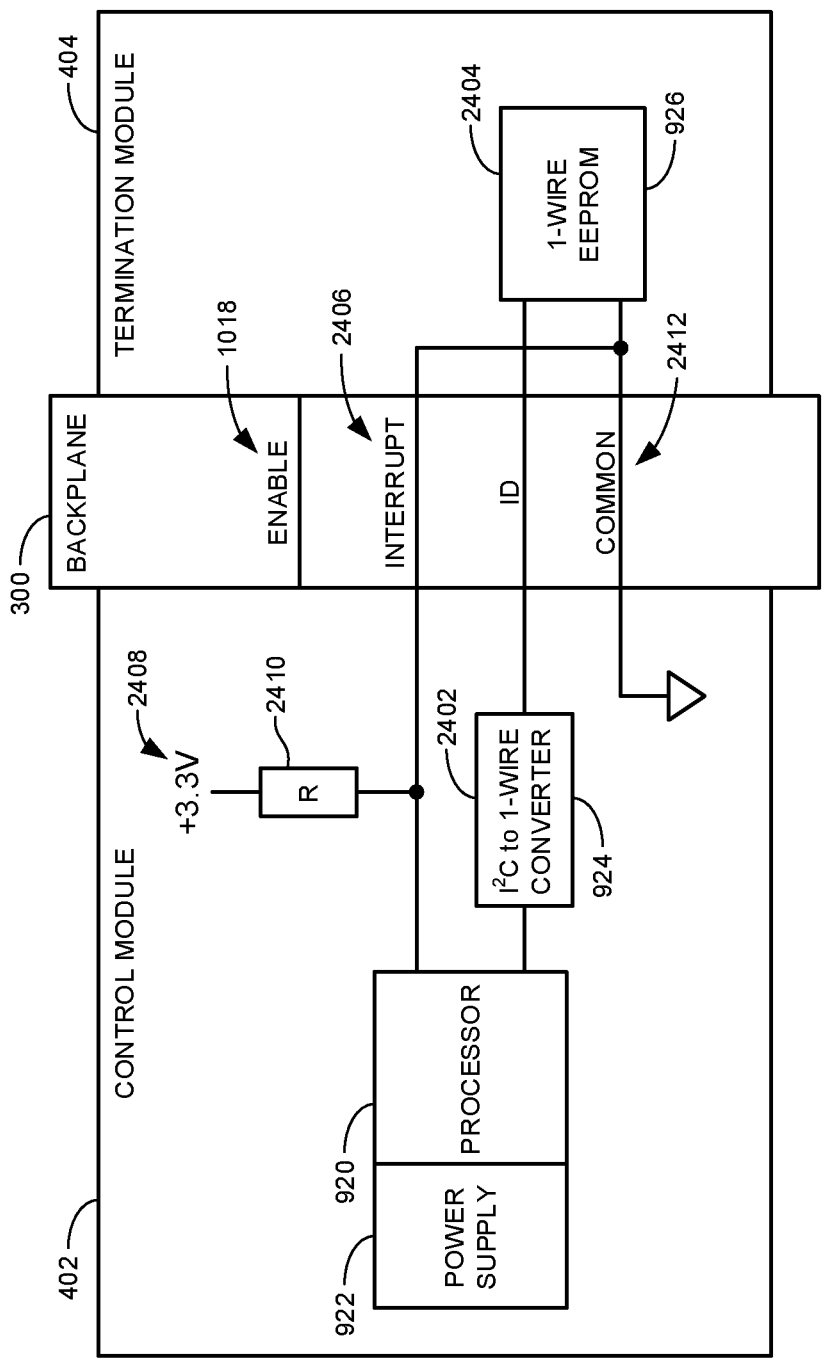
FIG. 24 is a block diagram illustrating another example implementation of the electronic keying functionality of the example control module and the example termination module of FIG. 9.

FIG. 24 is a block diagram illustrating another example implementation of the electronic keying functionality of the example control module and the example termination module of FIG. 9. As described above, in connection with FIG. 10, the termination module detector 924 (in the control module 402) and the module type indicator 926 (in the termination module 404) each include a resistor that together form a resistive voltage divider 1002 when the control module 402 and the termination module 404 are communicatively coupled via the backplane 300. By contrast, in the illustrated example of FIG. 24, the termination module detector 924 (in the control module 402) corresponds to an inter-integrated circuit ($I^2C$) to 1-wire converter 2402 and the module type indicator 926 (in the termination module 404) corresponds to an erasable programmable read-only memory (EEPROM) 2404 capable of 1-wire digital communications. In such examples, the EEPROM 2404 contains a unique code that identifies the type of the termination module 404. The code may be programmed during the manufacturing of the termination module 404. While the example implementation of FIG. 10 enables the unique identification of up to 80 unique types of termination modules (based on different resistance values), the memory of the EEPROM 2404 should be sufficient to enable the unique identification of any practical number of termination modules. Further, in some examples, the EEPROM 2404 may also contain other identifying information specific to each individual termination module 404 such as, for example, manufacturing information (e.g., the serial number, date of manufacture, location of manufacture, lot number, version number, etc.).

In the illustrated example of FIG. 24, the processor 920 of the control module 402 continuously, periodically, or aperiodically reads the identification code on the EEPROM 2404 via the converter 2402 to identify and verify the compatibility of the termination module 404 with the control module 402. If the termination module 404 is determined to not be compatible, the processor 920 may prevent communications (e.g., disable the enable signal 1018) and/or generate suitable error messages. Further, the processor 920 may configure the control module 402 and/or enable output communications with the termination module 404 if the module is determined to be compatible.

In addition to identifying the type of termination module 404 to verify compatibility, the control module 402 of the illustrated example may also detect the initial insertion or removal of the termination module 404 when under power. As shown in FIG. 24, the control module 402 and the termination module 404 include a dedicated signal or interrupt 2406 that connects to an interrupt pin of the processor 920. When the termination module 404 is detached from the backplane 300, the interrupt signal 2406 on the control module 402 is pulled high due to the voltage 2408 across a resistor 2410. However, as shown in the illustrated example, when the termination module 404 is electrically coupled to the control module 402 via the backplane 300, the interrupt signal 2406 is connected to circuit common 2412 or ground via the termination module 404. In the illustrated example, the processor 920 is capable of detecting either a rising or falling edge at the interrupt 2406.

When the termination module 404 is removed, the interrupt 2406 is no longer connected to ground such that it will rise to the pulled high level resulting in a rising edge interrupt. In response to detecting the rising edge, the processor 920 may disable I/O signals to the termination block and stop I/O scanning. In some such examples, the processor 920 may also generate an alarm to indicate the detected removal of the termination module 404.

By contrast, when the termination module 404 is initially inserted into the backplane 300, the interrupt 2406 (previously pulled to the high level) will be connected to ground causing a falling edge interrupt. In response to detecting the falling edge, the processor 920 may begin the validation process to identify the termination module 404 to confirm it is a type that is compatibility with the control module 402. In some examples, if a first termination module 404 is removed and a second termination module is inserted while the control module 402 is under power, the processor 920 compares the types of each of the termination modules. If the newly installed termination module 404 is the same type as the removed module, the processor 920 may automatically enable communications with the termination module 404 and return to normal I/O scanning. However, in examples where the newly installed termination module is determined to be different than the module previously removed, the processor 920 may generate an alarm requesting operator input to configure the control module 402 and/or the termination module 404 before communications are enabled.

Figure 25:
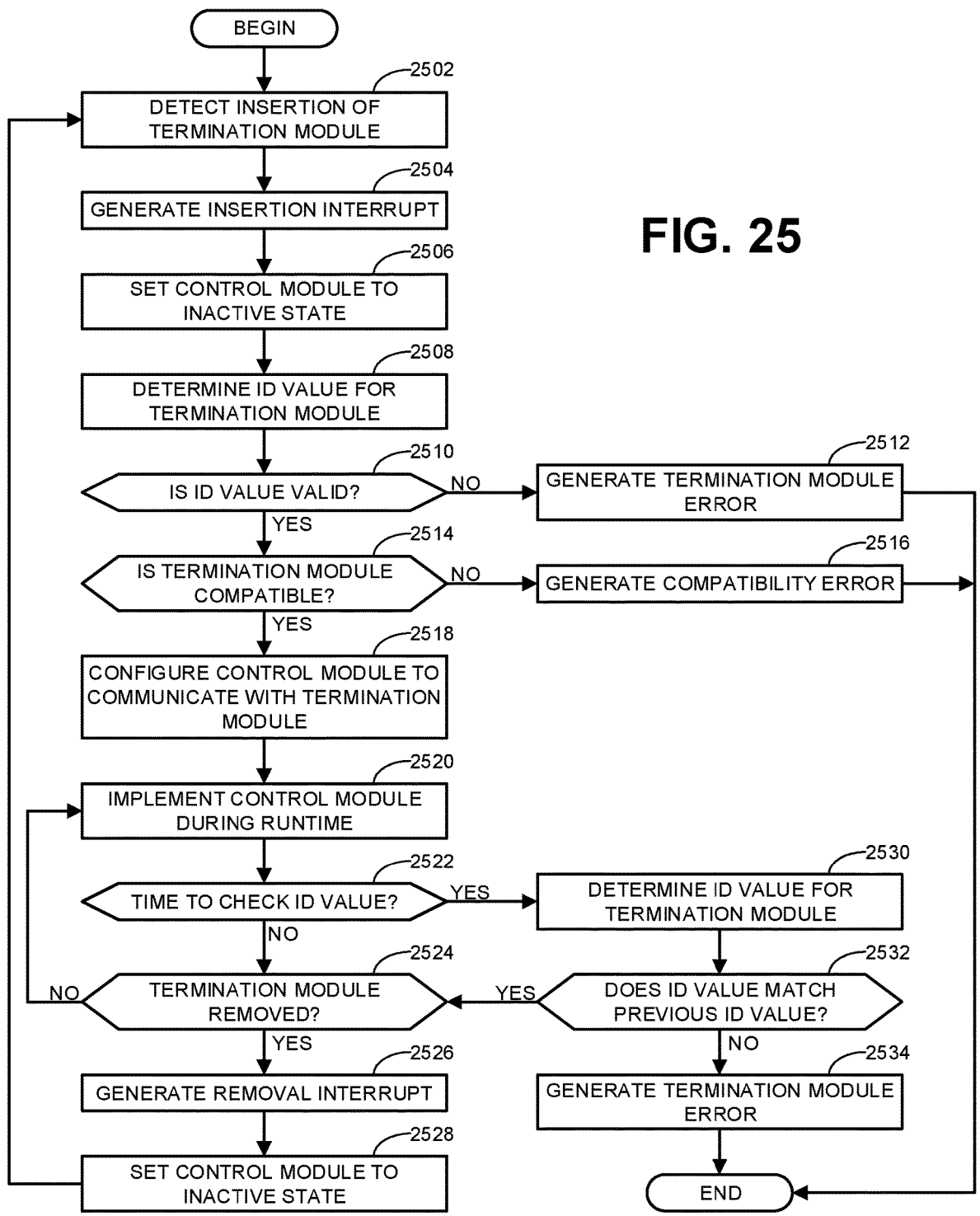
FIG. 25 is a flowchart representative of an example method for implementing one of the example control modules of FIG. 4 to identify the corresponding example termination module.

A flowchart representative of an example method for implementing one of the example control modules 402 of FIG. 4 to identify one of the termination modules 404 of FIG. 4 is shown in FIG. 25. In this example, the method may be implemented using machine readable instructions that comprise a program for execution by a processor such as the processor 2612 shown in the example processor platform 2600 discussed below in connection with FIG. 26. The program may be embodied in software stored on a tangible computer readable storage medium such as a CD-ROM, a floppy disk, a hard drive, a digital versatile disk (DVD), a Blu-ray disk, or a memory associated with the processor 2612, but the entire program and/or parts thereof could alternatively be executed by a device other than the processor 2612 and/or embodied in firmware or dedicated hardware. Further, although the example program is described with reference to the flowchart illustrated in FIG. 25, many other methods of implementing the example control modules 402 may alternatively be used. For example, the order of execution of the blocks may be changed, and/or some of the blocks described may be changed, eliminated, or combined.

As mentioned above, the example methods of FIG. 25 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIG. 25 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

In the example method of FIG. 25 it is assumed that a control module 402 has already been installed in a rack 200 and is under power. The method of FIG. 25 begins at block 2502 where the control module 402 detects the insertion of a termination module 404 into a corresponding termination slot of the rack 200. In some examples, the comparator circuit 1020 of the control module 402 detects the insertion of a termination module 404 based on a detected drop in the output voltage 1014 of the voltage divider 1002 formed between the control module 402 and the termination module 404. In other examples, the processor 920 of the control module 402 detects the insertion of a termination module 404 based on the detection of voltage drop in the interrupt signal 2406 as the termination module 404 connects the signal to ground. At block 2504, the comparator circuit generates an insertion interrupt. In some examples, the insertion interrupt is provided to the processor 920 of the control module to indicate that a termination module 404 has been installed. At block 2506, the example processor 920 sets the control module 402 to an inactive state. In some examples, the processor 920 enters the inactive or input only mode by deactivating the enable signal (e.g., the enable signal 1018 of FIG. 10 or the enable signal 1312 of FIG. 13) to the conditioning circuits of the termination module 404 and setting all channels to the input mode. In such a state, communications from the field terminals of the termination module 404 are prohibited. In some examples, pullups (or pulldowns) are used on hardware to deactivate the enable signal 1018 and to set all channels to input mode when the processor 920 is powering up. In some examples, where the termination module 404 is detected directly via the processor 920 as described in connection with FIG. 24, the processor 920 automatically sets the control module 402 to an inactive state.

At block 2508, the example processor determines an identification value for the termination module 404. In some examples, the identification value is the 16 bit digital value corresponding to the output voltage 1014 of the voltage divider 1002 as converted by the ADC 1024. In some examples, the identification value differs between different types of termination modules 404 based on a different identification resistor 1004 provided in each type of termination module 404. In some examples, the identification value is based on the data retrieved from the EEPROM 2404 of the termination module 404. At block 2510, the example processor 920 determines whether the identification value is valid (e.g., corresponds to a recognizable type of termination module). If not, control advances to block 2512 where the example processor 920 generates a termination module error. In some examples, the termination module error is indicated via the termination module status indicator 512. Thereafter, the example method of FIG. 25 ends.

Returning to block 2510, if the example processor 920 determines that the identification value is valid, control advances to block 2514 where the example processor 920 determines whether the termination module is compatible with the control module 402. If not, control advances to block 2524 where the example processor 920 generates a compatibility error. In some examples, the compatibility error is indicated via the termination module status indicator 512. Thereafter, the example method of FIG. 25 ends.

Returning to block 2514, if the example processor 920 determines that the termination module is compatible with the control module 402, control advances to block 2518 where the example processor 920 configures the control module 402 to communicate with the termination module 404. At block 2520, the example processor 920 implements the control module 402 during runtime.

At block 2522, the example processor 920 determines whether it is time to check the identification value of the termination module 404. In some examples, the identification value is checked on a periodic or aperiodic basis. If it is not time to check the identification value, control advances to block 2524 where the control module 402 determines whether the termination module 402 has been removed. In some examples, the comparator circuit 1020 detects the removal of a termination module 404 based on a detected rise in the output voltage 1014 of the voltage divider 1002 formed between the control module 402 and the termination module 404. In some examples, the processor 920 detects the removal of a termination module 404 based on the interrupt signal 2406 being pulled to the high level as described in connection with FIG. 24. If the control module 402 determines that the termination module 404 has not been removed, control returns to block 2520 to continue implementing the control module 402. If the control module 402 determines that the termination module 404 has been removed, control advances to block 2526 where the comparator circuit generates a removal interrupt. In other examples, as described above in connection with FIG. 24, the processor 920 of the control module may directly determine that a termination module 404 has been removed based on the interrupt signal 2406. In examples where the I²C device 2402 detects the absence of the termination module 404, the processor 920 is informed of the removal by continually polling the I²C device 2402. At block 2528, the example processor 920 sets the control module 402 to an inactive state, whereupon control returns to block 2502 to detect the insertion of another termination module.

Returning to block 2522, if the example processor 920 determines it is time to check the identification value, control advances to block 2530 where the example processor 920 determines the identification value for the termination module 404 (e.g., based on a reading of the output voltage 1014 of the voltage divider 1002 or a reading of the data retrieved from the EEPROM 2404). At block 2532, the example processor 920 determines whether the identification value matches the previous identification value. If so, control returns to block 2524. If not, control advances to block 2534 where the example processor 920 generates a termination module error. Thereafter, the example method of FIG. 25 ends.

Figure 26:
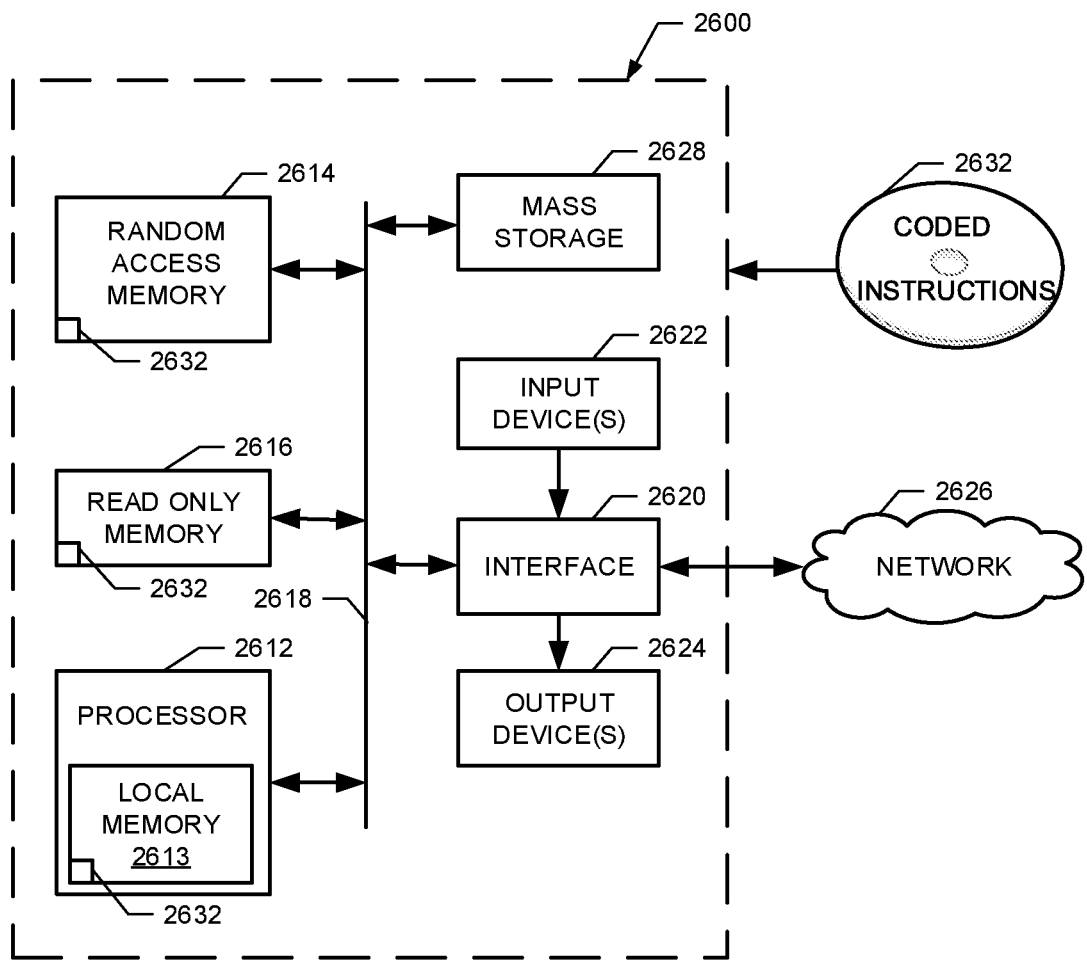
FIG. 26 is a schematic illustration of an example processor platform that may be used and/or programmed to carry out the example method of FIG. 25 and/or, more generally, to implement one of the example control modules of FIG. 4.

FIG. 26 is a block diagram of an example processor platform 2600 capable of executing the method of FIG. 25 to implement any of the control modules 402 of FIG. 4. The processor platform 2600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 2600 of the illustrated example includes a processor 2612. The processor 2612 of the illustrated example is hardware. For example, the processor 2612 can be implemented by one or more integrated circuits, logic circuits, microprocessors or controllers from any desired family or manufacturer.

The processor 2612 of the illustrated example includes a local memory 2613 (e.g., a cache). The processor 2612 of the illustrated example is in communication with a main memory including a volatile memory 2614 and a non-volatile memory 2616 via a bus 2618. The volatile memory 2614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2616 may be implemented by flash memory and/or any other desired type of memory device. Access to the main memory 2614, 2616 is controlled by a memory controller.

The processor platform 2600 of the illustrated example also includes an interface circuit 2620. The interface circuit 2620 may be implemented by any type of interface standard, such as an Ethernet interface, a universal serial bus (USB), and/or a PCI express interface.

In the illustrated example, one or more input devices 2622 are connected to the interface circuit 2620. The input device(s) 2622 permit(s) a user to enter data and commands into the processor 2612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2624 are also connected to the interface circuit 2620 of the illustrated example. The output devices 2624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2620 of the illustrated example, thus, typically includes a graphics driver card, a graphics driver chip or a graphics driver processor.

The interface circuit 2620 of the illustrated example also includes a communication device such as a transmitter, a receiver, a transceiver, a modem and/or network interface card to facilitate exchange of data with external machines (e.g., computing devices of any kind) via a network 2626

(e.g., an Ethernet connection, a digital subscriber line (DSL), a telephone line, coaxial cable, a cellular telephone system, etc.).

The processor platform 2600 of the illustrated example also includes one or more mass storage devices 2628 for storing software and/or data. Examples of such mass storage devices 2628 include floppy disk drives, hard drive disks, compact disk drives, Blu-ray disk drives, RAID systems, and digital versatile disk (DVD) drives.

Coded instructions 2632 to implement the method of FIG. 23 may be stored in the mass storage device 2628, in the volatile memory 2614, in the non-volatile memory 2616, and/or on a removable tangible computer readable storage medium such as a CD or DVD.

From the foregoing, it will be appreciated that the above disclosed methods, apparatus and articles of manufacture can provide greater flexibility, increased efficiency, and reduced costs to engineers or other individuals desiring to communicatively couple field devices to RTUs. As described above, these advantages are achieved by including core I/O functionalities in control modules while including application-specific functionalities in termination modules that are manufactured as separate components to be interfaced via a backplane of a base rack or chassis. The separation of these components enables the replacement of the relatively low cost termination modules without the need to also replace the more expensive control modules. Further, in some examples, the termination modules are implemented with circuitry to provide surge protection for the control modules such that common failure modes are likely only to damage the low cost termination modules while increasing the useful life of the control modules. Additionally, the circuitry in different types of termination modules can be used to condition or characterize the control modules in different ways, thereby enabling different applications without the need for multiple standalone I/O cards that may only be used for a single purpose and would be more expensive than the termination modules. Further still, in some examples, a control module and a corresponding termination module when communicatively coupled via a backplane form an electrical circuit that enables the control module to automatically identify the termination module to determine whether there are any compatibility issues.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a backplane of a base rack for a remote terminal unit in a process control system;
a termination slot of the backplane to receive a termination module, wherein the termination module includes a terminal block configured to receive wires that are communicatively coupled to a field device; and
a first control slot of the backplane to receive a control module that is separate from the termination module, wherein the control module is communicatively couplable with the termination module via a termination link of the backplane that communicatively couples the control slot to the termination slot, wherein the control module is configured to control communications with the field device, wherein the termination module includes signal conditioning circuitry, and wherein the termination module provides an identification signal when the termination module and the control module are communicatively coupled via the termination link.

2. The apparatus of claim 1, wherein the identification signal includes a first value when the termination module corresponds to a first type of termination module, the identification signal includes a second value when the termination module corresponds to a second type of termination module, the control module including a processor to identify the type of the termination module based on the identification signal.

3. The apparatus of claim 2, wherein the control module automatically prevents communication of signals between the control module and the field device when the type of the termination module is not compatible with the control module.

4. The apparatus of claim 2, wherein the first type of termination module includes a first conditioning circuit to condition signals between the field device and control module, the second type of termination module includes a second conditioning circuit to condition signals between the field device and control module, the second conditioning circuit is different than the first conditioning circuit.

5. The apparatus of claim 4, wherein the first conditioning circuit is at least one of a surge protection circuit, a high side driver, a low side driver, an alternating current input circuit, an alternating current output circuit, a high voltage input circuit, a millivolt-to-volt amplifier, a pulse amplifier, a differential amplifier, an output fuse, or a redundancy block.

6. The apparatus of claim 4, wherein the first conditioning circuit is associated with a first channel of the first type of termination module, the first type of termination module including a third conditioning circuit associated with a second channel of the first type of termination module, the first conditioning circuit having different circuitry than the third conditioning circuit.

7. The apparatus of claim 1, wherein removal of the termination module from the termination slot is to cause a voltage rise in a signal monitored by the control module.

8. The apparatus of claim 1, wherein insertion of the termination module into the termination slot is to cause a voltage drop in a signal monitored by the control module, the voltage drop to trigger a validation process to verify a compatibility of the termination module with the control module.

9. The apparatus of claim 1, wherein the signal conditioning circuitry is on a signal conditioning card, the signal conditioning card including a backplane connector to communicatively couple the termination module to the backplane.

10. A method comprising:
coupling a termination module to a termination slot of a base rack for a remote terminal unit in a process control system, wherein the termination module includes a terminal block configured to receive wires that are communicatively coupled to a field device;
coupling a control module to a control slot of the base rack, wherein the control module is communicatively couplable with the termination module via a termination link that communicatively couples the control slot to the termination slot on a backplane of the base rack, wherein the control module is configured to control communications with the field device, and wherein the termination module includes signal conditioning circuitry; and
providing, via the termination module, an identification signal when the termination module and the control module are communicatively coupled via the termination link on the backplane of the base rack.

11. The method of claim 10, wherein the identification signal includes a first value when the termination module corresponds to a first type of termination module, the identification signal includes a second value when the termination module corresponds to a second type of termination module, the control module including a processor to identify the type of the termination module based on the identification signal.

12. The method of claim 11, further including preventing, via the control module, communication of signals between the control module and the field device when the first type of the termination module is not compatible with the control module.

13. The method of claim 11, wherein the first type of termination module includes a first conditioning circuit to condition signals between the field device and control module, wherein the second type of termination module includes a second conditioning circuit to condition signals between the field device and control module, the second conditioning circuit different from the first conditioning circuit.

14. The method of claim 13, wherein the first conditioning circuit is associated with a first channel of the first type of termination module, the first type of termination module including a third conditioning circuit associated with a second channel of the first type of termination module, the first conditioning circuit having different circuitry than the third conditioning circuit.

15. The method of claim 10, wherein removal of the termination module from the termination slot is to cause a voltage rise in a signal monitored by the control module.

16. The method of claim 10, wherein insertion of the termination module into the termination slot is to cause a voltage drop in a signal monitored by the control module, the voltage drop to trigger a validation process to verify a compatibility of the termination module with the control module.

17. The method of claim 10, wherein the signal conditioning circuitry is on a signal conditioning card, the signal conditioning card including a backplane connector to communicatively couple the termination module to the backplane.

18. A non-transitory machine readable medium comprising instructions that, when executed, cause a processor to at least:
monitor an identification signal provided by a termination module when the termination module is communicatively coupled to a control module via a backplane of a base rack supporting the control module and the termination module, wherein the termination module is insertable in a termination slot of the base rack, wherein the termination module includes a terminal block configured to receive wires that are communicatively coupled to a field device, wherein the control module is insertable in a control slot of the base rack, and wherein the termination module includes signal conditioning circuitry;
identify a type of the termination module based on the identification signal; and
prevent communication of signals between the control module and a field device wired to the termination module when the type of the termination module is not compatible with the control module.

19. The non-transitory machine readable medium of claim 18, wherein the instructions further cause the processor to configure the control module based on the identified type of the termination module.

20. The non-transitory machine readable medium of claim 18, wherein the instructions further cause the processor to generate a compatibility signal indicating whether the type of the termination module is compatible with the control module.

21. The non-transitory machine readable medium of claim 18, wherein the instructions further cause the processor to prevent communication of signals between the control module and a field device wired to the termination module when the type of the termination module is not compatible with the control module.

22. The non-transitory machine readable medium of claim 18, wherein the signal conditioning circuitry is on a signal conditioning card, and wherein the signal conditioning card includes a backplane connector to communicatively couple the termination module to the backplane.

* * * * *